(12) United States Patent
Katsumata et al.

(10) Patent No.: US 11,902,555 B2
(45) Date of Patent: Feb. 13, 2024

(54) INFORMATION PROCESSING DEVICE AND INFORMATION PROCESSING METHOD

(71) Applicant: SONY GROUP CORPORATION, Tokyo (JP)

(72) Inventors: Mitsuru Katsumata, Tokyo (JP); Ryohei Takahashi, Kanagawa (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 16 days.

(21) Appl. No.: 17/416,907

(22) PCT Filed: Dec. 20, 2019

(86) PCT No.: PCT/JP2019/050028
§ 371 (c)(1),
(2) Date: Jun. 21, 2021

(87) PCT Pub. No.: WO2020/137854
PCT Pub. Date: Jul. 2, 2020

(65) Prior Publication Data
US 2022/0053205 A1    Feb. 17, 2022

(30) Foreign Application Priority Data

Dec. 28, 2018    (JP) .................... 2018-248321

(51) Int. Cl.
*H04N 19/597* (2014.01)
*H04N 19/46* (2014.01)
*H04N 21/81* (2011.01)
*H04N 21/84* (2011.01)

(52) U.S. Cl.
CPC ........... *H04N 19/46* (2014.11); *H04N 19/597* (2014.11); *H04N 21/816* (2013.01); *H04N 21/84* (2013.01)

(58) Field of Classification Search
CPC ...... H04N 19/46; H04N 21/84; H04N 19/597; H04N 21/81
See application file for complete search history.

(56) References Cited

U.S. PATENT DOCUMENTS

| 2009/0066783 A1* | 3/2009 | Lee ...................... H04N 13/161 |
| | | 348/E13.001 |
| 2012/0128058 A1 | 5/2012 | Bakharov et al. |

(Continued)

FOREIGN PATENT DOCUMENTS

| CN | 104537709 A | 4/2015 |
| EP | 3346709 A1 | 7/2018 |

(Continued)

OTHER PUBLICATIONS

Second working draft for Video-based Point Cloud Coding (V-PCC), Nov. 2018, pp. 1-55.

(Continued)

*Primary Examiner* — Dave Czekaj
*Assistant Examiner* — Berteau Joisil
(74) *Attorney, Agent, or Firm* — Paratus Law Group, PLLC

(57) ABSTRACT

There is provided an information processing device and an information processing method by which reproduction of a point cloud having no time information can be handled. Metadata that includes reproduction information necessary to reproduce encoded data obtained by encoding one frame of a point cloud by V-PCC or G-PCC and that includes reproduction feasibility information to be used to determine feasibility of reproducing the encoded data is generated. The encoded data and the metadata are stored in a file having a predetermined file structure using the ISOBMFF technology. The present technology is applicable to a data generation device that generates a file into which encoded data of (Continued)

INPUT Point Cloud

SEGMENTATION

Texture IMAGE geometry IMAGE

ENCODING BY VIDEO IMAGE CODEC a point cloud having no time information is stored, for example.

11 Claims, 42 Drawing Sheets

(56) References Cited

U.S. PATENT DOCUMENTS

| | | | |
|---|---|---|---|
| 2017/0347122 | A1 | 11/2017 | Chou |
| 2018/0103209 | A1 | 4/2018 | Fischler |
| 2018/0352219 | A1 | 12/2018 | Maze et al. |
| 2021/0303616 | A1* | 9/2021 | Fukada ................ G06F 16/164 |

FOREIGN PATENT DOCUMENTS

| | | | | |
|---|---|---|---|---|
| JP | 2003099263 | A | | 4/2003 |
| WO | WO-2015194082 | A1 | | 12/2015 |
| WO | WO-2020060813 | A1 | * | 3/2020 ............... G06T 9/00 |

OTHER PUBLICATIONS

Information technology—MPEG-I (Coded Representation of Immersive Media)—Part 9: Geometry-based Point Cloud Compression, ISO/IEC 23090-9:2018(E), Nov. 2018, pp. i-48.

First idea on Systems technologies for Point Cloud Coding, International Organisation for Standardisation, ISO/IEC JTC1/SC29/WG11, MPEG2018/w17675, Apr. 2018, pp. 1-6, San Diego, US.

WD of Storage of V-PCC in ISOBMFF Files, International Organisation for Standardisation, ISO/IEC JTC1/SC29/WG11, Oct. 2018, pp. 1-7, Macau, Macao S.A.R., China.

Text of ISO/IEC 14496-12:2015/PDAM 2: Information technology—Coding of audio-visual objects—Part 12: ISO base media file format, Amendment 2: Support for Image File Format [SC 29/WG 11 N 16165], ISO/IEC JTC1/SC29 N15989, Jun. 2016, pp. i-8.

David Singer et al., White paper on an Overview of the ISO Base Media File Format, International Organisation for Standardisation, ISO/IEC JTC1/SC29/WG11, MPEG2018/N18093, Oct. 2018, pp. 1-11, Macau, China.

Information Technology—MPEG systems technologies—Part 12: Image File Format, ISO/IEC FDIS 23008-12, Jun. 26, 2015, pp. i-86, 2nd edition.

Yip et al., WD of Storage of V-PCC in ISOBMFF Files, International Organisation for Standardisation ISO/IEC JTC1/SC29/WG11 Coding of Moving Pictures and Audio, Oct. 2018, pp. 1-7, Macau, Macao S.A.R., China.

Ilola et al., Carriage of Mpeg V-PCC bitstreams in ISOBMFF, International Organisation for Standardisation ISO/IEC JTC1/SC29/WG11 Coding of Moving Pictures and Audio, Oct. 2018, pp. 1-4, Macao, China.

Wang, An Overview of Omnidirectional MediA Format (OMAF), A tutorial @VCIP2017, Dec. 10, 2017, pp. 1-105, Qualcomm.

* cited by examiner

FIG. 7

```
aligned(8) class VPCCDecoderConfigurationRecord {
    unsigned int(8) configurationVersion = 1;
    unsigned int(24) profile;
    unsigned int(8) level;
    unsigned int(16) frame_width;
    unsigned int(16) frame_height;
    unsigned int(2) lengthSizeMinusOne;
    unsigned int(8) numVpccUnits;
```
⎫ COPY INFORMATION NECESSARY FOR
⎬ REPRODUCTION DETERMINATION FROM SPS
⎭

```
    for(j=0; j < numVpccUnits; j++) {
        bit(3) reserved = 0;
        unsigned int(5) vpcc_unit_type;
        unsigned int(16) vpccUnitLength;
        bit(8* vpccUnitLength) vpccUnit;
    }
}
```
⎫
⎬ STORE Parameter Set
⎭

```
class VPCCConfigurationBox extends Box('vpcC') {
    VPCCDecoderConfigurationRecord() VPCCConfig;
}
```

FIG. 11

```
aligned(8) class componentSampleEntryBox extends FullBox('cpse',0,0)
{
  unsigned int(4) type;
  if (type == 1){ // attribute
    unsigned int(4) attribute_type;
  else{
    bit(4) reserved;
  }
  SampleEntry(); // HEVC, AVC, ...
}
aligned(8) class SubSampleEntryProperty extends ItemProperty('sube')
{
  componentSampleEntryBox  compSampleEntry[];
}
```

FIG.12

| type | component type |
|---|---|
| 0 | reserved |
| 1 | geometry data |
| 2 | occupancy data |
| 3 | attribute data |
| others | reserved |

FIG.13

| attribute_type | attribute type |
|---|---|
| 0 | texture |
| 1 | Normals |
| 2 | Reflectance |
| 3 | Material |
| 4 | Transparency |
| others | reserved |

FIG. 14

```
aligned(8) class subItemPropertyEntry extends FullBox('cpse',0,0)
{
  unsigned int(4) type;
  if (type == 1){ // attribute
    unsigned int(4) attribute_type;
  else{
    bit(4) reserved;
  }
  properties ItemProperty() []; // boxes derived from
    // ItemProperty or ItemFullProperty, to fill box
}
aligned(8) class SubItemProperty extends ItemProperty( 'sube' )
{
  subItemPropertyEntry  subItemProp[];
}
```

FIG. 17

```
aligned(8) class PrimaryItemBox extends FullBox('pitm', version, 0) {
 if (version == 0) {
  unsigned int(16) item_ID;
 } else if (version == 1) {
  unsigned int(32) item_ID;
 } else if (version == 2) {
  unsigned int(32) group_id;
 }
}
```

FIG. 18

```
aligned(8) class PrimaryGroupBox extends FullBox('pgrp', version, 0) {
    unsigned int(32) group_id;
}
```

FIG. 19

```
aligned(8) class VPCCMultiItemProperty extends ItemProperty('vpcm')
{
 unsigned int(4) type;
 if (type == 1) { // attribute
  unsigned int(4) attribute_type;
 else{
  bit(4) reserved;
 }
}
```

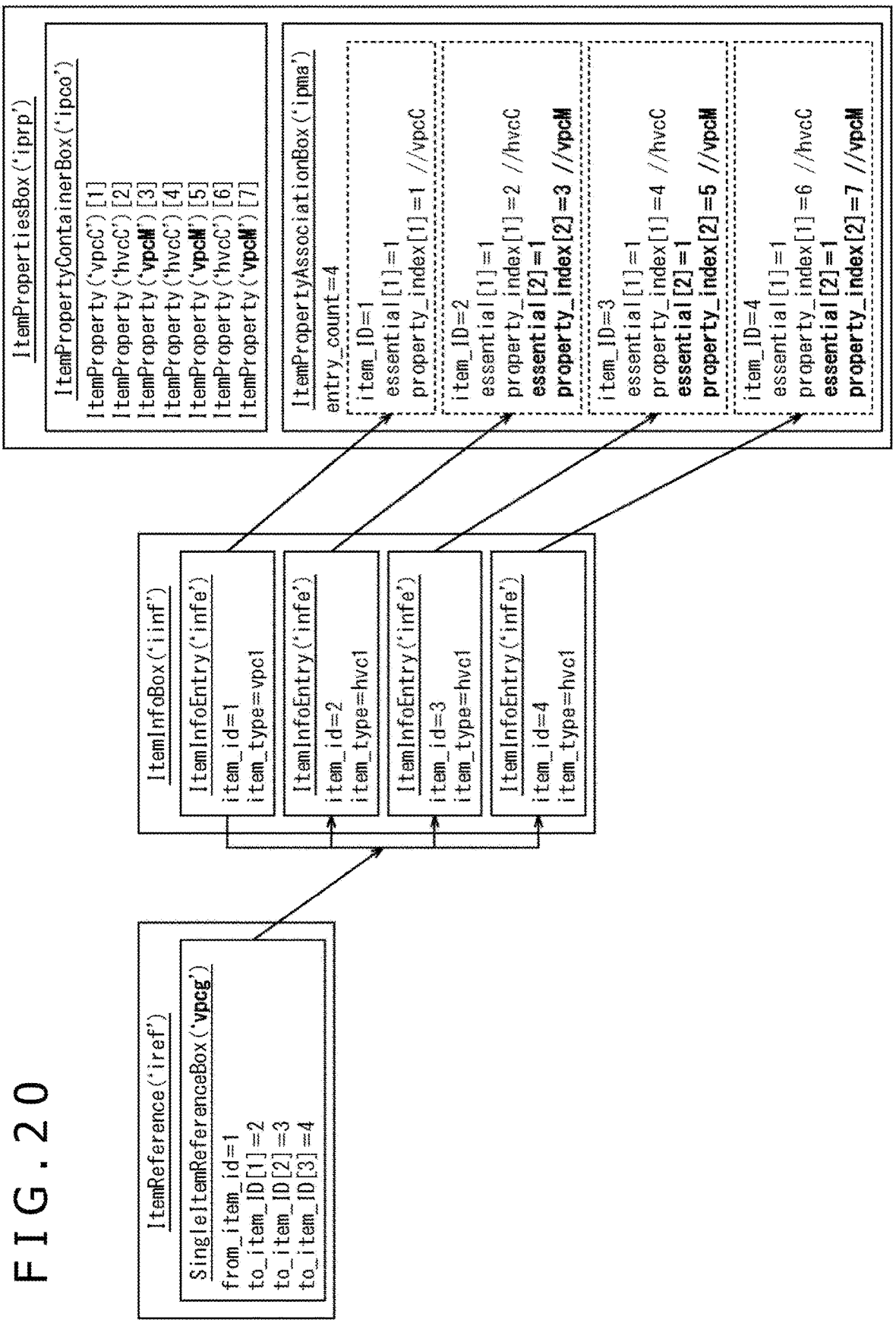
F I G . 2 0

FIG.21

```
aligned(8) class vpccReferenceParameterSetProperty extends ItemProperty('vrps')
{
  unsigned int(8) numParameterSet;
  for (i=0; i<numParameterSet) {
    unsigned int(8) vpcC_vpccUnit_index;
  }
}
```

FIG. 23

```
aligned(8) class vpccUniteHeaderProperty extends ItemProperty("vuhd")
{
    unsigned int(8)  vpcc_unit_header_length;
    unsigned int(8*  vpcc_unit_header_length)  vpcc_unit_header;
}
```

FIG. 24

```
aligned(8) class vpccParameterSetProperty extends ItemProperty('vpss')
{
    unsigned int(8) numVpccUnits;
    for (j=0; j < numVpccUnits; j++) {
        bit(3) reserved = 0;
        unsigned int(5) vpcc_unit_type;
        unsigned int(16) vpccUnitLength;
        bit(8* vpccUnitLength) vpccUnit;
    }
}
```

FIG. 26

```
aligned(8) class OriginalFormatProperty extends ItemProperty('frma')
{
    unsigned int(32) data_format;   //codingname
}
```

FIG. 27

```
aligned(8) class SchemeTypeProperty extends ItemFullProperty('schm', 0, flag)
{
    unsigned int(32) scheme_type;    // 4CC identifying the scheme
    unsigned int(32) scheme_version; // scheme version
    if (flags & 0x000001) {
        unsigned int(8) scheme_uri[]; // browser uri
    }
}
```

FIG. 29

```
aligned(8) class VPCCMultiItemProperty extends ItemProperty('vpcm')
{
    unsigned int(4) type;
    if (type == 1) { // attribute
        unsigned int(4) attribute_type;
    else{
        bit(4) reserved;
    }
}
```

F I G . 3 1

```
aligned(8) class GPCCDecoderConfigurationRecord {
  unsigned int(8) configurationVersion = 1;
  unsigned int(8) profile_idc;
  unsigned int(24) profile_compatibility_flags;  ⎫ COPY INFORMATION NECESSARY FOR
  unsigned int(8) level_idc;                     ⎭ REPRODUCTION DETERMINATION FROM SPS
  unsigned int(2) lengthSizeMinusOne;
  unsigned int(8) numGpccUnits;
  for (j=0;j < numGpccUnits;j++) {               ⎫
    bit(3) reserved = 0;                         ⎪
    unsigned int(5) gpcc_unit_type;              ⎬ STORE Parameter Set
    unsigned int(16) gpccUnitLength;             ⎪
    bit(8* gpccUnitLength) gpccUnit;             ⎭
  }
} class GPCCConfigurationBox extends Box('gpcC') {
  GPCCDecoderConfigurationRecord() GPCCConfig;
}
```

FIG. 32

```
aligned(8) class SubSampleItemProperty extends ItemFullProperty('subs', version, flags) {
    unsigned int(32) entry_count;
    int i,j;
    for (i=0; i < entry_count; i++) {
        unsigned int(32) sample_delta; //=0
        unsigned int(16) subsample_count;
        if (subsample_count > 0) {
            for (j=0; j < subsample_count; j++) {
                if(version == 1) {
                    unsigned int(32) subsample_size;
                }else{
                    unsigned int(16) subsample_size;
                }
                unsigned int(8) subsample_priority;
                unsigned int(8) discardable;
                unsigned int(32) codec_specific_parameters;
            }
        }
    }
}
```

FIG. 33

```
unsigned int(4) data_type;
if (type == 1) { // attribute
    unsigned int(4) attribute_type;
else{
    bit(4) reserved;
}
unsinged int(24) reserved;
```

F I G . 3 4

| data_type | component type |
|---|---|
| 0 | Auxiliary information data (V-PCC ONLY) |
| 1 | geometry data |
| 2 | occupancy data (V-PCC ONLY) |
| 3 | attribute data |
| others | reserved |

F I G . 3 5

| attribute_type | attribute type |
|---|---|
| 0 | texture |
| 1 | Normals |
| 2 | Reflectance |
| 3 | Material |
| 4 | Transparency |
| others | reserved |

FIG. 36

```
aligned(8) class gpccMultiItemProperty extends ItemFullProperty('gpcM', 0, 0)
{
  unsigned int(7) reserved;
  unsigned int(1) isGeometryStream;
  if (isGeometryStream) {
    unsigned int(32) num_attribute_bitstream;
  }else{
    unsigned int(4) reserved;
    unsigned int(4) attribute_type;
  }
}
```

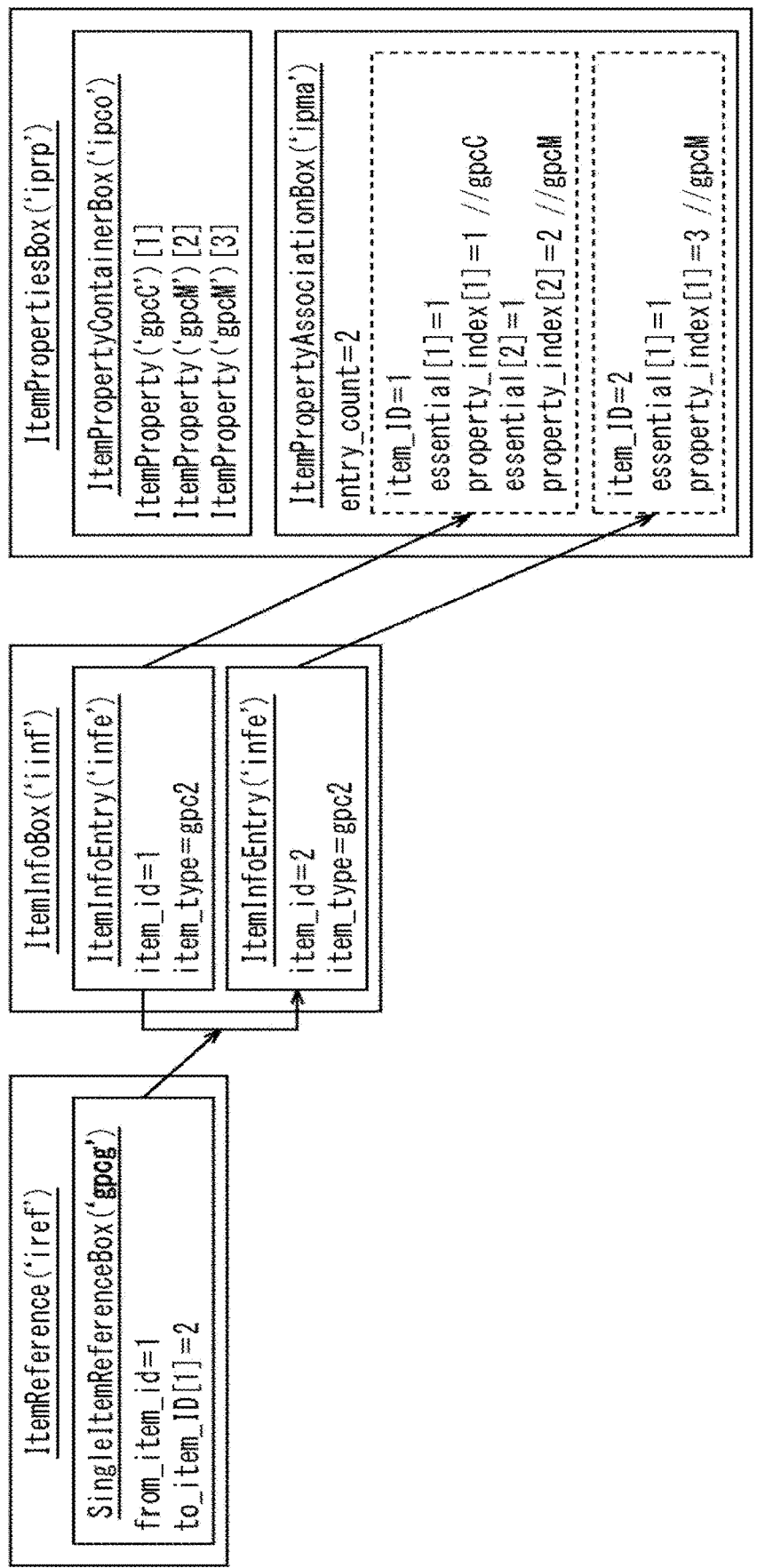
F I G . 3 8

FIG. 39

```
aligned(8) class AttributeSelectionProperty extends ItemFullProperty('atsl', 0, 0)
{
    unsigned int(8) selection_entry_count;
    for(i=0; I < selection_entry_count; i++) {
        unsigned int(8) attribute_num;
        for(j=0; j < attribute_num; j++) {
            unsigned int(4) attribute_type;
        }
    }
}
```

INFORMATION PROCESSING DEVICE AND INFORMATION PROCESSING METHOD

CROSS REFERENCE TO PRIOR APPLICATION

This application is a National Stage Patent Application of PCT International Patent Application No. PCT/JP2019/050028 (filed on Dec. 20, 2019) under 35 U.S.C. § 371, which claims priority to Japanese Patent Application No. 2018-248321 (filed on Dec. 28, 2018), which are all hereby incorporated by reference in their entirety.

TECHNICAL FIELD

The present disclosure relates to an information processing device and an information processing method, and particularly, relates to an information processing device and an information processing method by which reproduction of a point cloud having no time information can be handled.

BACKGROUND ART

Conventionally, methods for compressing a point cloud, which is an assembly of points having both positional information and attribute information (particularly, color information) in a three-dimensional space, have been defined, as disclosed in pieces of NPL 1 and 2.

For example, in one of the point cloud compression methods, a point cloud is divided into multiple regions (hereinafter, referred to as segmentation), a texture image and a geometry image are generated through planar projection for each region, and then, the images are encoded by a video image codec. The geometry image includes depth information regarding a point assembly forming a point cloud. This method is called V-PCC (Video-based Point Cloud Coding), and is described in detail in NPL 1.

In another one of the compression methods, a point cloud is separated into a geometry which represents a three-dimensional shape and an attribute which represents color or reflection information as attribute information, and the geometry and the attribute are encoded. This method is called G-PCC (Geometry based Point Cloud Coding).

Then, a use case in which a V-PCC stream or a G-PCC stream generated by the above encoding is downloaded and reproduced, or is distributed over an over IP (Internet Protocol) network, has been expected.

Then, in order to achieve early implementation of services while suppressing an impact on the existing distribution platforms, study of a distribution technology based on ISOBMFF/DASH (ISO Base Media File Format/Dynamic Adaptive Streaming over HTTP) which is an existing framework in MPEG (Moving Picture Experts Group) has been commenced, as described in NPL 3.

Further, NPL 4 discloses a scheme pertaining to a storage method for storing a V-PCC stream in a file having a file structure using the ISOBMFF technology.

CITATION LIST

Non Patent Literature

[NPL 1]
  m45183 second working draft for Video-based Point Cloud Coding (V-PCC).
[NPL 2]
  m45183 working draft for Geometry-based Point Cloud Coding (G-PCC).
[NPL 3]
  w17675, First idea on Systems technologies for Point Cloud Coding, April 2018, San Diego, US
[NPL 4]
  w18059, Working Draft of Storage of V-PCC in ISOBMFF Files

SUMMARY

Technical Problem

Meanwhile, is a conventional use case, a V-PCC stream or a G-PCC stream generated by V-PCC or G-PCC encoding of a point cloud that includes a plurality of frames at a predetermined time interval as in a video image is stored in a file having a file structure using the ISOBMFF technology. In contrast, it is expected that a use case in which a point cloud (i.e., point cloud of one frame) having no time information as in map data, for example, is encoded by V-PCC or G-PCC, and is stored in a file having a file structure using the ISOBMFF technology will be required. Handling of such a use case is being desired.

The present disclosure has been made in view of the abovementioned circumstance, and is provided to become capable of handling reproduction of a point cloud having no time information.

Solution to Problem

A device according to a first aspect of the present disclosure includes a metadata generation section that generates metadata that includes reproduction information necessary to reproduce a bitstream generated from 3D data having no time information and that includes reproduction feasibility information to be used to determine feasibility of reproducing the bitstream, and a file generation section that generates a file in which the bitstream and the metadata are stored.

An information processing method according to the first aspect of the present disclosure includes generating metadata that includes reproduction information necessary to reproduce a bitstream generated from 3D data having no time information and that includes reproduction feasibility information to be used to determine feasibility of reproducing the bitstream, and generating a file in which the bitstream and the metadata are stored.

In the first aspect of the present disclosure, metadata that includes reproduction information necessary to reproduce a bitstream generated from 3D data having no time information and that includes reproduction feasibility information to be used to determine feasibility of reproducing the bitstream is generated, and a file in which the bitstream and the metadata are stored is generated.

A device according to a second aspect of the present disclosure includes a metadata generation section that generates metadata that includes reproduction information necessary to reproduce a plurality of bitstreams generated from 3D data having no time information and that includes reproduction feasibility information to be used to determine feasibility of reproducing the bitstreams, and a file generation section that generates a file in which the bitstreams and the metadata are stored.

An information processing method according to the second aspect of the present disclosure includes generating metadata that includes reproduction information necessary to reproduce a plurality of bitstreams generated from 3D data having no time information and that includes reproducbility of reproducing the bitstreams, and generating a file in which the bitstreams and the metadata are stored.

In the second aspect of the present disclosure, metadata that includes reproduction information necessary to reproduce a plurality of bitstreams generated from 3D data having no time information and that includes reproduction feasibility information to be used to determine the feasibility of reproducing the bitstreams is generated, and a file in which the bitstreams and the metadata are stored is generated.

BRIEF DESCRIPTION OF DRAWINGS

FIG. 7 is a diagram depicting one example of a structure of VPCCConfigurationBox('vpcC').

FIG. 11 is a diagram depicting one example of a structure of ItemProperty('sube').

FIG. 12 is a diagram depicting one definition example of data_type.

FIG. 13 is a diagram depicting one definition example of attribute_type.

FIG. 14 is a diagram depicting one example of signaling using an ItemProperty structure.

FIG. 17 is a diagram depicting one example of extended PrimaryItemBox.

FIG. 18 is a diagram depicting one example of PrimaryGroupBox.

FIG. 19 is a diagram depicting one example of a syntax of ItemProperty.

FIG. 20 is a diagram depicting one example of a file configuration using the syntax in FIG. 19.

FIG. 21 is a diagram depicting one example of a syntax of ItemProperty('vrps').

FIG. 23 is a diagram depicting one example of ItemProperty('vuhd') for signaling a vpcc_unit_header.

FIG. 24 is a diagram depicting one example of a syntax of vpccParameterSetProperty('vpss').

FIG. 26 is a diagram depicting one example of ItemProperty('frma').

FIG. 27 is a diagram depicting one example of ItemProperty('schm').

FIG. 29 is a diagram depicting one example of signaling using a Restricted scheme.

FIG. 31 is a diagram depicting one example of a structure of GPCCConfigurationBox('gpcC').

FIG. 32 is a diagram depicting one example of SubSampleItemProperty('subs') based on an existing standard.

FIG. 33 is a diagram depicting one definition example of codec_specific_parameters.

FIG. 34 is a diagram depicting one definition example of data_type.

FIG. 35 is a diagram depicting one definition example of attribute_type.

FIG. 36 is a diagram depicting one example of a structure of GPCCMultiItemProperty.

FIG. 38 is a diagram depicting one example of a G-PCC multi item a start point of which is Item_id.

FIG. 39 is a diagram depicting one example of Attribute combination signaling.

DESCRIPTION OF EMBODIMENTS

Hereinafter, specific embodiments to which the present technology is applied will be explained in detail with reference to the drawings.

<Conventional V-PCC and G-PCC>

First, the conventional V-PCC and G-PCC will be explained.

For example, map data is one example of data (hereinafter, also referred to as 3D data) that is expressed by a point cloud which indicates a three-dimensional shape. Unlike an object the shape of which varies with time, map data does not deform, and is considered to have no time information. Therefore, a use case in which a point cloud (that is, 1 PC sample corresponding to one frame of the point cloud) having no time information as map data is encoded by V-PCC or G-PCC can be expected. It is to be noted that, in the following explanation, encoded data obtained by V-PCC encoding a point cloud having no time information is referred to as V-PCC still image data, and encoded data obtained by G-PCC encoding a point cloud having no time information is referred to as G-PCC still image data.

For example, one conventional standard for storing data having no time information into a file having a file structure using the ISOBMFF technology is ISO/IEC 23008-12 MPEG-H Image File Format (hereinafter, referred to as an HEIF). On the other hand, a two-dimensional image may be encoded by a video image codec such as AVC (Advanced Video Coding) or HEVC (High Efficiency Video Coding) into two-dimensional image data having no time information, and the two-dimensional image data may be stored into a file having a file structure using ISOBMFF.

Therefore, if an HEIF is extended, for example, it is highly likely to achieve storing V-PCC still image data and G-PCC still image data into ISOBMFF while considering these pieces of data in a manner similar to two-dimensional image data that has no time information and is obtained by compression by a video image codec.

V-PCC will be explained with reference to FIGS. 1 to 4.

Figure 1:
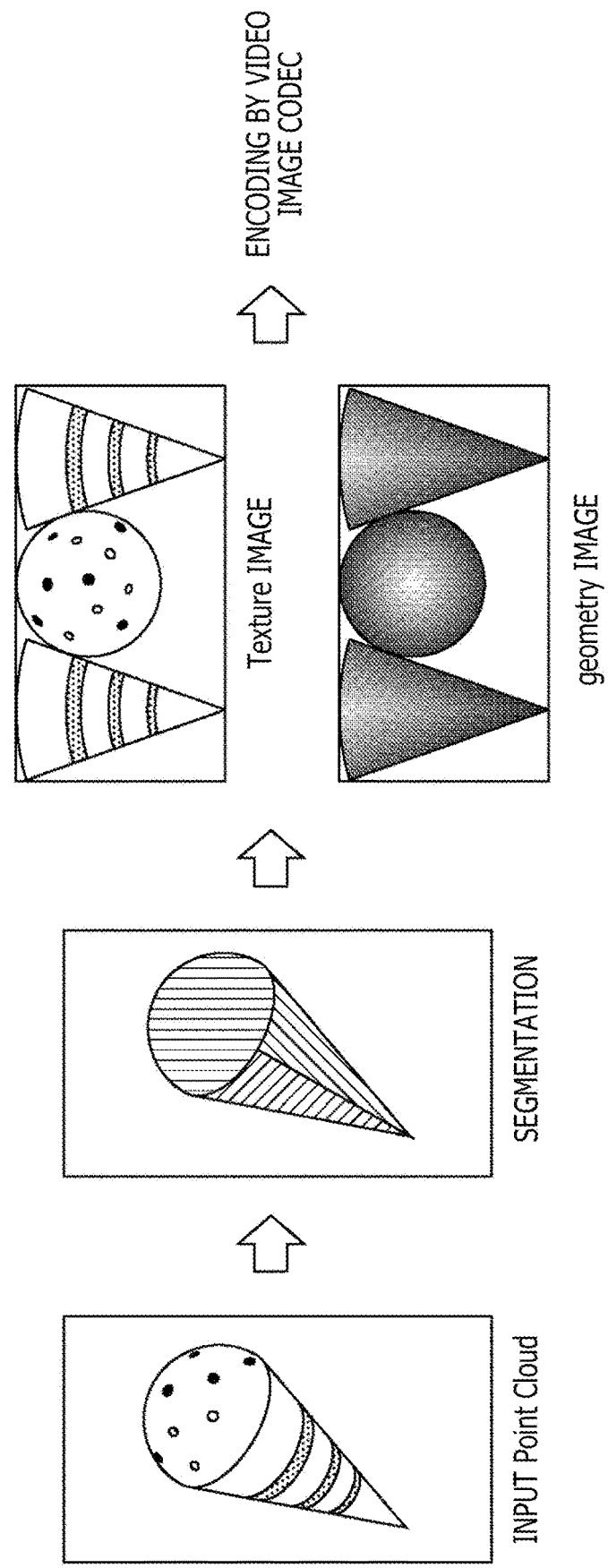
FIG. 1 is a diagram for explaining a point cloud compression method using V-PCC.

FIG. 1 is a diagram for briefly explaining the point cloud compression method using V-PCC disclosed in NPL 1 mentioned above.

As depicted in FIG. 1, a point cloud indicating a three-dimensional structure is first inputted, and the point cloud is segmented. In the example depicted in FIG. 1, a point cloud indicating a three-dimensional structure obtained by combining a hemispherical shape and a conical shape is inputted, and the point cloud is segmented into three regions such that the hemispherical shape and the conical shape are divided into one region and two regions, respectively.

Next, planar projection for each of the regions is performed to generate a texture image that includes color information indicating the visual aspects of the surfaces of the respective regions and to generate a geometry image that includes positional information indicating depths to the surfaces of the respective regions. Then, the texture image and the geometry image are encoded by a video image codec such as AVC or HEVC.

Figure 2:
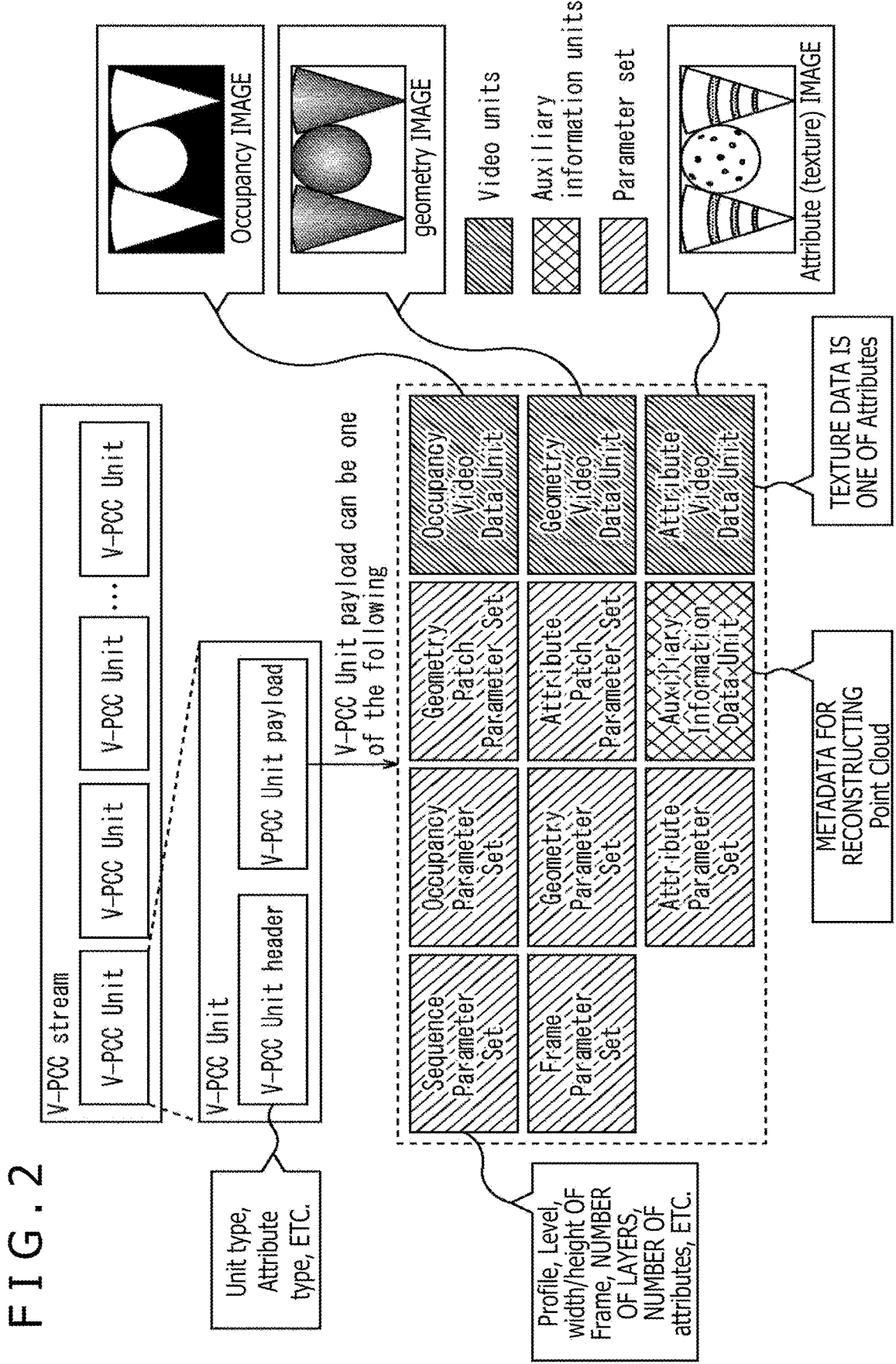
FIG. 2 is a diagram depicting one example of a structure of a V-PCC stream.

FIG. 2 depicts a conventional stream structure encoded by V-PCC disclosed in NPL 1 mentioned above. Such a stream is called a V-PCC stream.

As depicted in FIG. 2, a V-PCC stream includes one stream and includes a plurality of V-PCC units. The V-PCC units each include a V-PCC Unit header and a V-PCC Unit payload.

For example, the V-PCC Unit header indicates a unit type that represents the type of Data included in the V-PCC unit payload, and additional information (e.g., an attribute type, or for which point cloud frame the information is) for the corresponding unit type. Here, a Point Cloud frame (hereinafter, also referred to as a PC frame) refers to a point cloud that is displayed at the same time.

In addition, the V-PCC Unit payload includes a Video unit, an Auxiliary information unit, and a Parameter Set, as depicted in FIG. 2. An encoded texture image is stored in an Attribute video data unit. An encoded geometry image is stored in a geometry video data unit. Three-dimensional information metadata to be used for 2D-3D conversion is stored in an auxiliary information data unit and an occupancy video data unit. Metadata for each data unit, metadata common in a Sequence, metadata common in a Frame, etc., are stored in Parameter Sets.

For example, a client decodes geometry video data in a PC stream, texture attribute video data, and occupancy data, and generates a geometry patch and a texture patch by using the decoded occupancy data. Subsequently, the client first generates a colorless point cloud from the geometry patch by using auxiliary information data, and then, gives colors to the point cloud according to the texture patch.

In addition, NPL 4 mentioned above discloses a scheme for regarding occupancy video data and geometry video data and attribute video data (texture in NPL 4) that use an existing video image codec, as separate video tracks, and storing any other parameter sets and auxiliary information data, etc., as metadata tracks.

Figure 3:
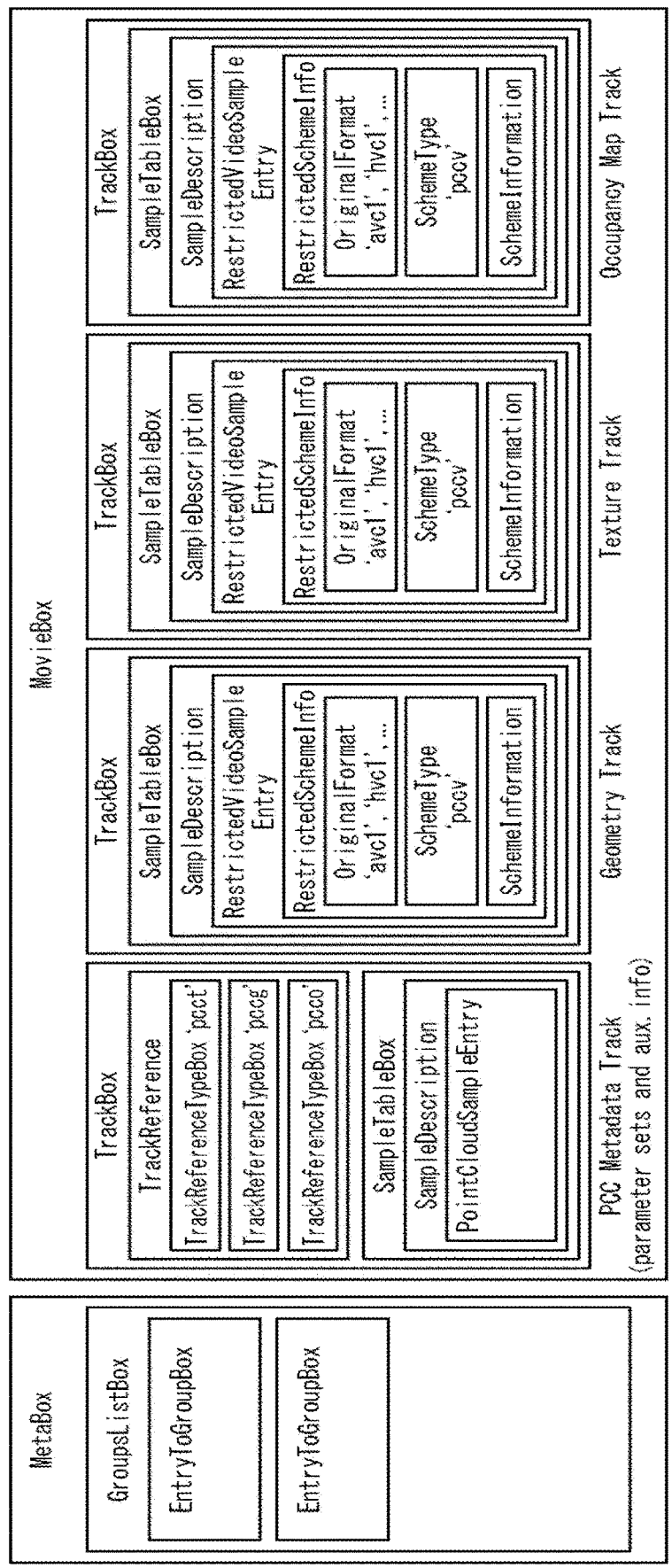
FIG. 3 is a diagram depicting one example of a file structure in a V-PCC video image format.

Further, this scheme uses EntityToGroupBox('vpcg') in order to indicate tracks constituting a V-PCC stream, as represented by a file structure of a V-PCC video image format in FIG. 3, for example. Specifically, EntityToGroupBox('vpcg'), in which track_id of PCC metadata, geometry, texture (attribute), and occupancy are signaled, is information set as a start point of reproduction.

Here, the configuration of a V-PCC stream of V-PCC still image data will be discussed.

In a case of a typical video image, a V-PCC stream has a configuration including multiple PC frames that are successively displayed at a particular time interval. In contrast, in a case of V-PCC still image data, a V-PCC stream has a configuration including one PC Frame only because one PC frame is sufficient and no time information is needed.

Figure 4:
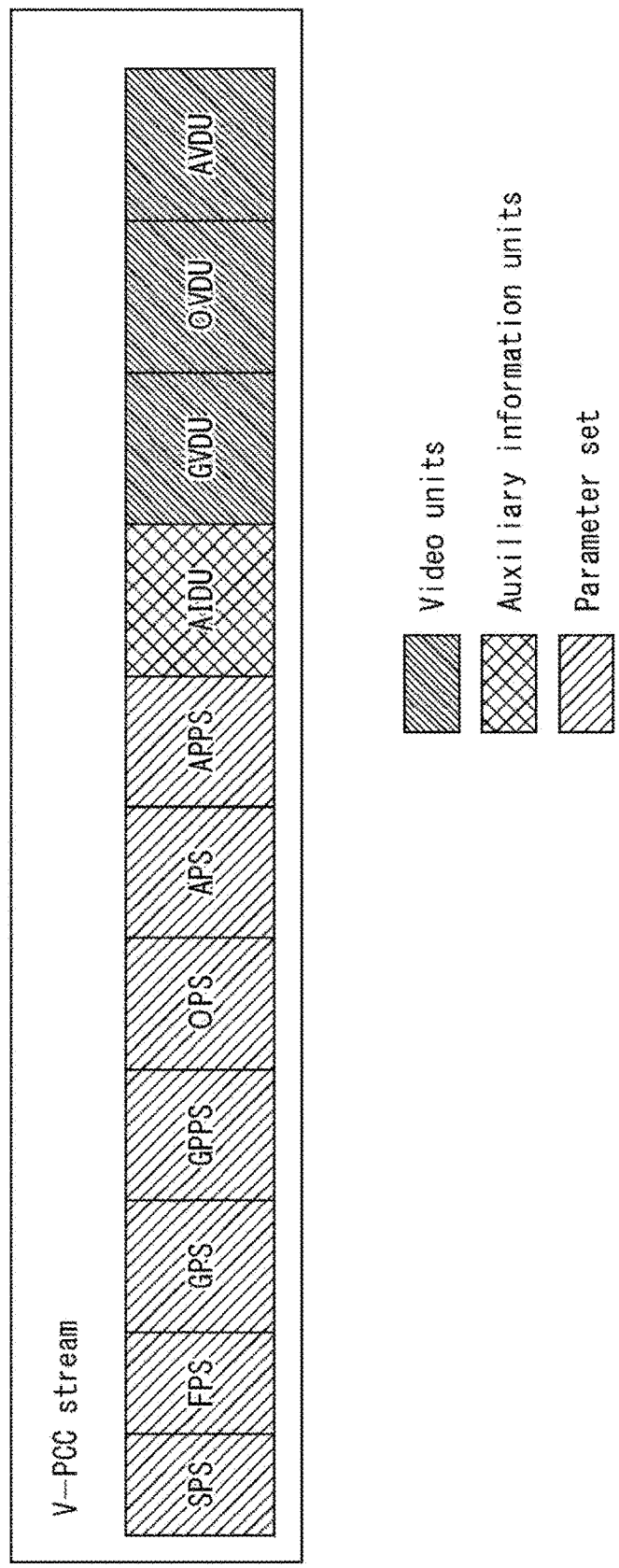
FIG. 4 is a diagram depicting one example of a structure of a V-PCC still image stream.

For example, a V-PCC stream of V-PCC still image data such as that depicted in FIG. 4 is referred to as a V-PCC still image stream, and a format therefor is referred to as a V-PCC still image format.

NPL 4 mentioned above proposes a storage method for storing a V-PCC stream of a video image into a file having a file structure using the ISOBMFF technology, but does not disclose or suggest a storage method for a V-PCC still image stream. Therefore, a new method of storing a V-PCC still image stream using an HEIF, in a manner which will be explained later, is proposed herein.

G-PCC will be explained with reference to FIG. 5.

Figure 5:
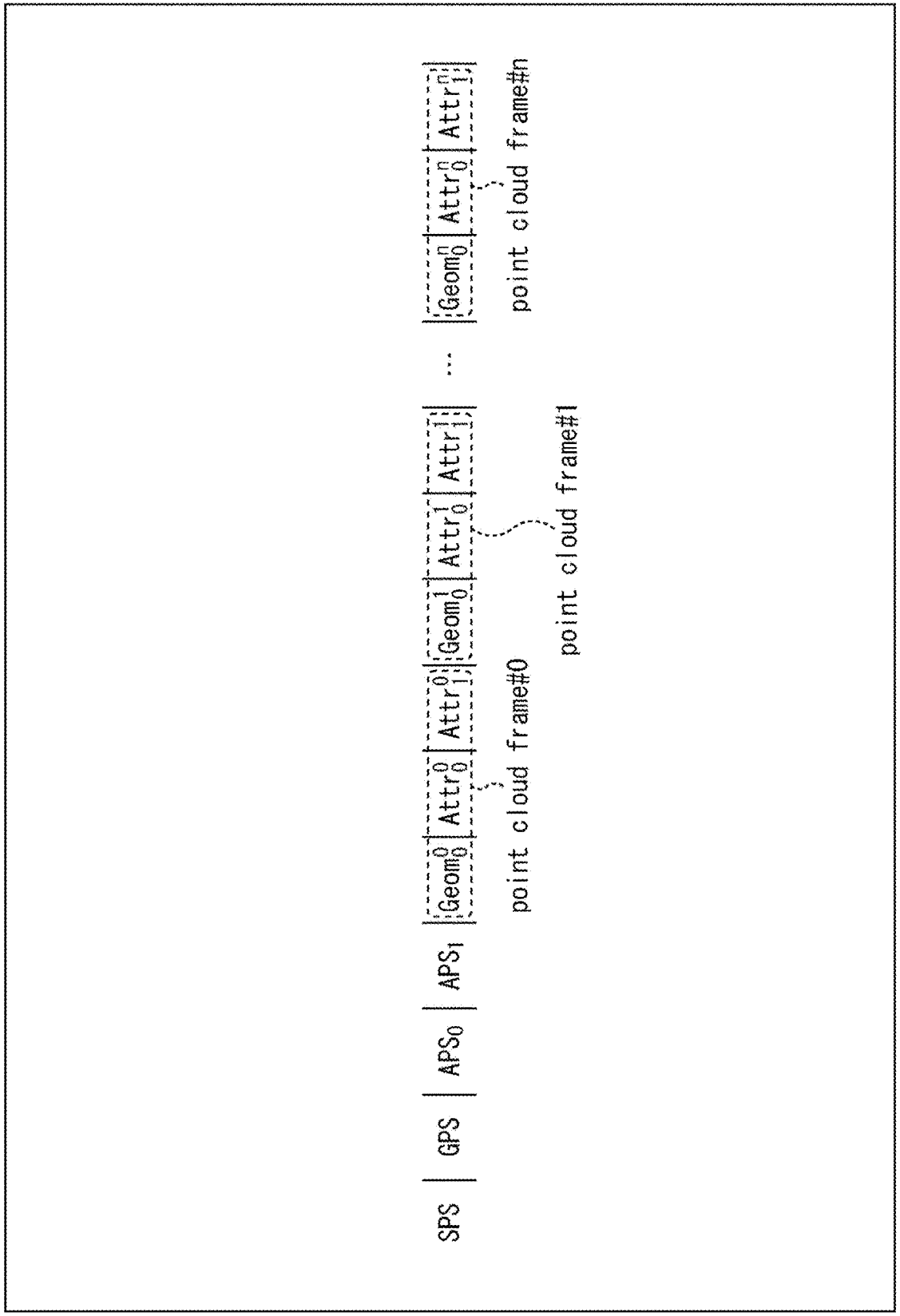
FIG. 5 is a diagram depicting one example of a structure of a G-PCC stream.

FIG. 5 depicts the conventional stream structure encoded by G-PCC, as disclosed in NPL 2 mentioned above. Such a stream is referred to as a G-PCC stream (or a PC stream, simply).

For example, a G-PCC stream includes 1 stream which is a succession of point cloud frames that are arranged in a decoding order. Here, a point cloud frame (hereinafter, also referred to as a PC frame) refers to point clouds to be displayed at the same time. A PC frame is one bitstream including a succession of a geometry bitstream (Geom in FIG. 5) indicating three-dimensional information and attribute bitstreams (Attr in FIG. 5) indicating attribute information regarding a color, a reflectance, etc.

It is to be noted that one PC frame includes one geometry bitstream and two or more attribute bitstreams (two attribute bitstreams in FIG. 5). In addition, as common information necessary to decode the geometry bitstream and the attribute bitstreams, meta information for each sequence of G-PCC streams is stored in an SPS (Sequence Parameter Set). Further, information necessary to decode the geometry bitstream is stored in a GPS (Geometry Parameter Set), and information necessary to decode the attribute bitstreams is stored in APSs (Attribute Parameter Sets).

Then, the client decodes the geometry bitstream and the attribute bitstreams in the G-PCC stream by means of different decoders. First, the client generates a colorless point cloud by decoding the geometry bitstream. Subsequently, the client decodes the attribute bitstreams by referring to information in the decoded geometry bitstream, and adds attributes such as a color and a reflectance on the basis of the information.

Here, the G-PCC stream configuration of G-PCC still image data will be discussed. In a case of a video image, a G-PCC stream has a configuration including multiple PC frames to be successively displayed at a particular time interval. In contrast, in a case of G-PCC still image data, a G-PCC stream has a configuration including one PC frame only because one PC frame is sufficient and no time information is needed. Hereinafter, a G-PCC stream of G-PCC still image data is referred to as a G-PCC still image stream, and a format therefor is referred to as a G-PCC still image format.

Further, a new method for storing a G-PCC still image stream with use of an HEIF, in a manner that will be explained later, is proposed herein.

Meanwhile, use cases of a V-PCC stream and a G-PCC stream include, in addition to a typical use case of reproducing a colored point cloud, a use case in which only three-dimensional shape information regarding a point cloud is used while attribute information such as a color or a reflectance is not needed. Specifically, there can be a use case in which colored map information acquired by LiDAR (Light Detection and Ranging) and by a camera is held as a point cloud, and only topographic information (i.e., three-dimensional shape information) is extracted from the point cloud and is used for automobile driving control, etc.

In addition, in a case where a plurality of pieces of attribute information such as a color and a reflectance is provided, there can be a use case in which only a color attribute is desired to be used together with a geometry for a preview without using a reflectance attribute, for example. Further, in a case where a plurality of attributes is provided, there is a use case in which only one of the attributes is desired to be used, that is, only one attribute is desired to be extracted and used.

However, in a V-PCC still image format (1-item version) and a G-PCC still image format, a geometry and a plurality of attributes need to be handled as one piece of Image data, for example, and no explicit boundary information therefor exists. For this reason, in the above use cases, a client needs to acquire the geometry and all the attributes, and then, fully decode the geometry and be attributes from the top of the stream. That is, not only an attribute to be used, among a plurality of attributes, but also an attribute which is not to be used is decoded. This deteriorates the processing efficiency.

Therefore, in the above use cases, it is desired to avoid decoding an attribute which is not to be used, for example, thereby preventing deterioration of the processing efficiency.

<V-PCC Still Image Format>

Here, methods of storing a V-PCC still image stream in an HEIF are defined for a V-PCC still image format (1-item version) and a V-PCC still image format (multi item version), separately.

First, a V-PCC still image format (1-item version) will be explained with reference to FIGS. 6 to 14.

A V-PCC still image stream includes V-PCC units, as depicted in FIG. 2 mentioned above. Further, the V-PCC units include Parameter Sets which are metadata for use in reproduction feasibility determination, decoding, and rendering, and Data units which are encoded data, etc.

In a conventional HEIF, when an image obtained by encoding using HEVC which is a video image codec is stored into a file having a file structure using the ISOBMFF technology, an HEVC stream is stored as an item. In order to store the HEVC stream as an item, item_type to indicate the item is an HEVC stream is defined. Further, metadata for use in reproduction feasibility determination and decoding or rendering is stored as Item Property in the HEVC stream, and encoded data in the HEVC stream is stored as Image data.

Therefore, it is proposed herein to also store a V-PCC still image street in an HEIF on the basis of the above basic concept. Specifically, item_type that indicates that the item is a V-PCC still image stream can be defined, a Parameter Set can be stored as Item Property, and a Data unit can be stored as Image data.

Figure 6:
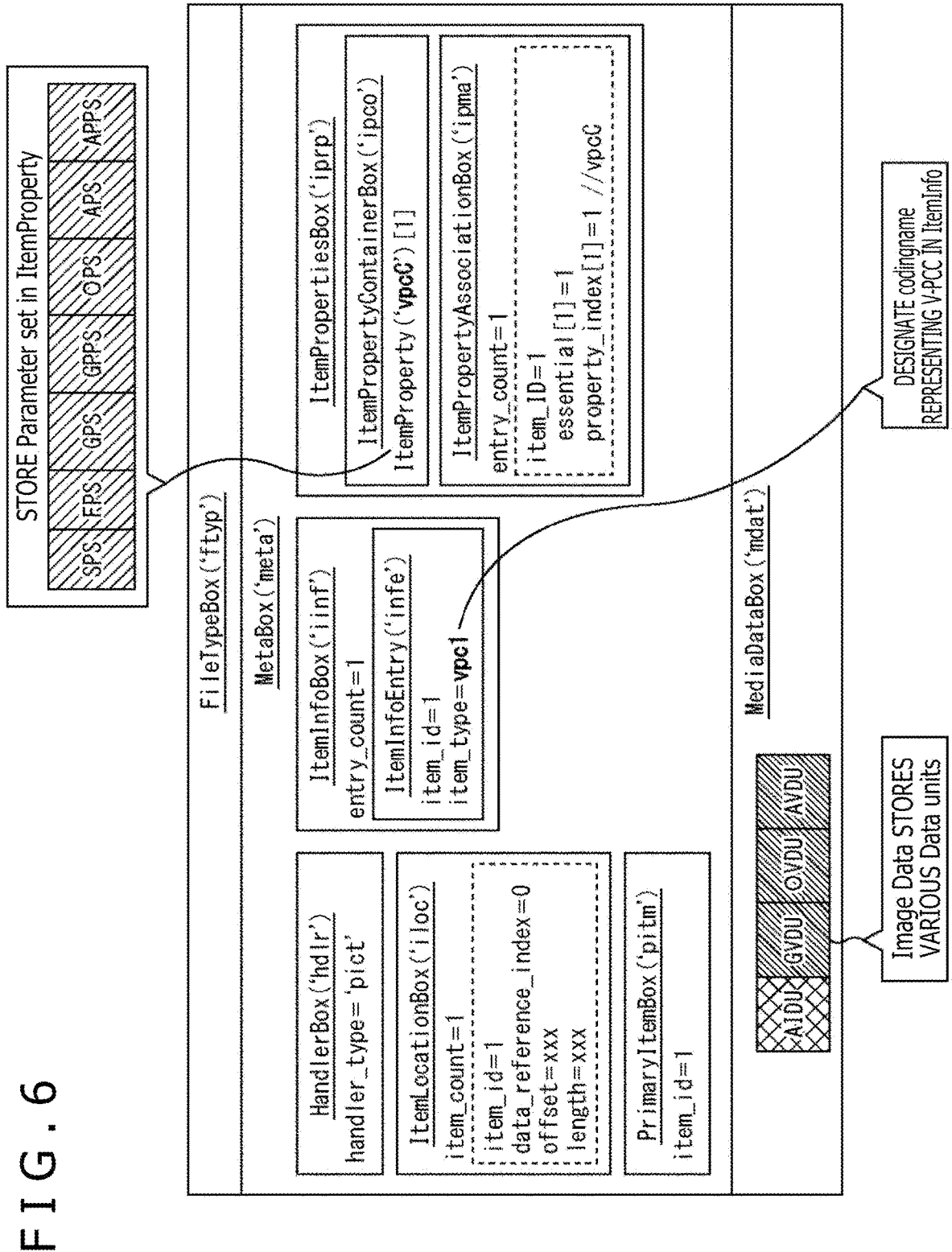
FIG. 6 is a diagram depicting one example of a file configuration of a V-PCC still image format (1-item version).

FIG. 6 depicts a specific file configuration of a V-PCC still image format (1-item version).

First, the type of an Item is designated by ItemInfoEntry ('infe'). In the example depicted in FIG. 6 item_type='vpc1' is set to designate a codingname that indicates V-PCC. In addition, Parameter Sets are signaled with 'vpcC' set in ItemProperty. For example, a structure such as that depicted in FIG. 7 is obtained. Moreover, Image data is stored in various Data units.

Figure 8:
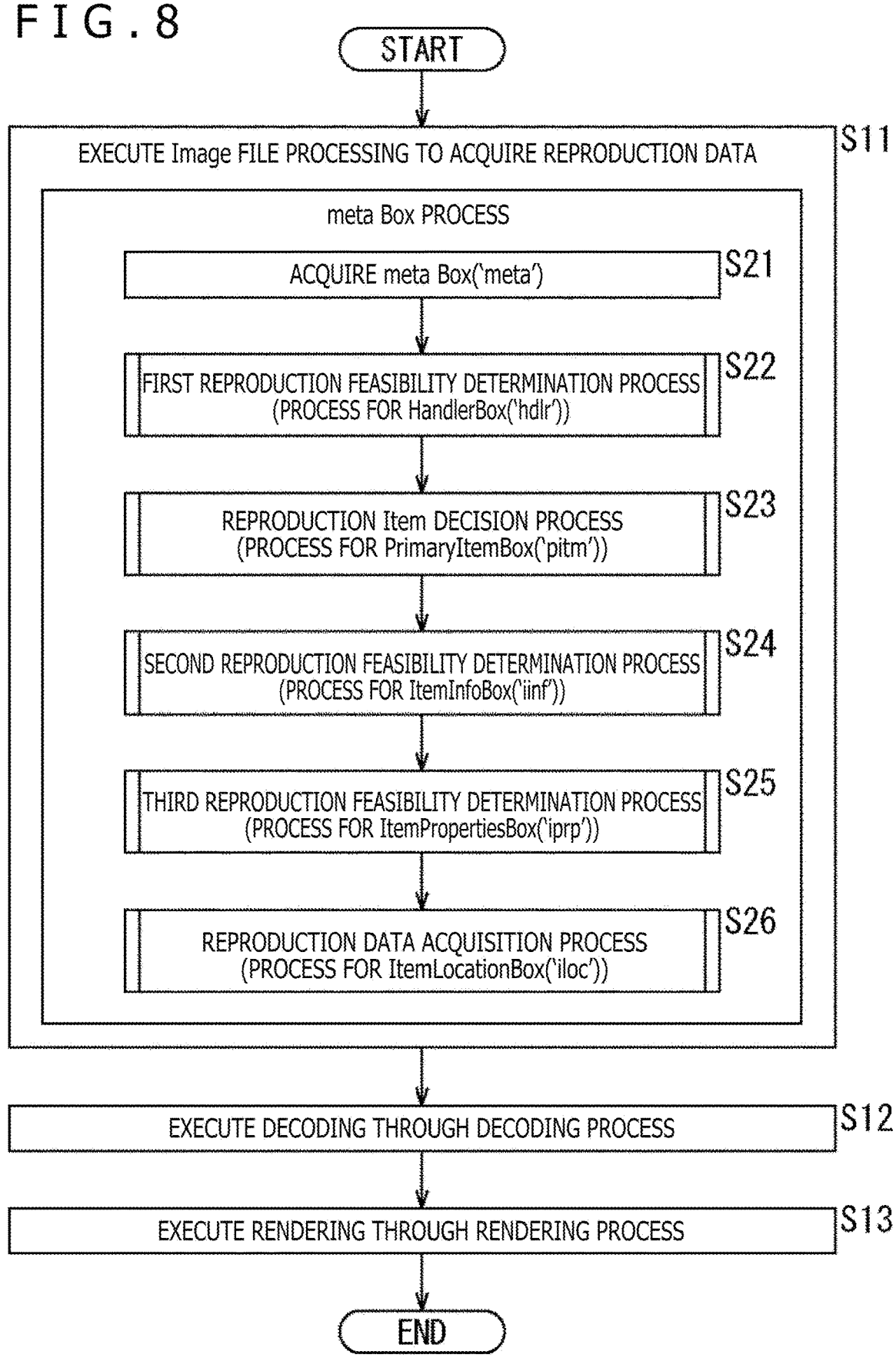
FIG. 8 is a flowchart for explaining a reproduction process of a V-PCC still image stream.
Figure 9:
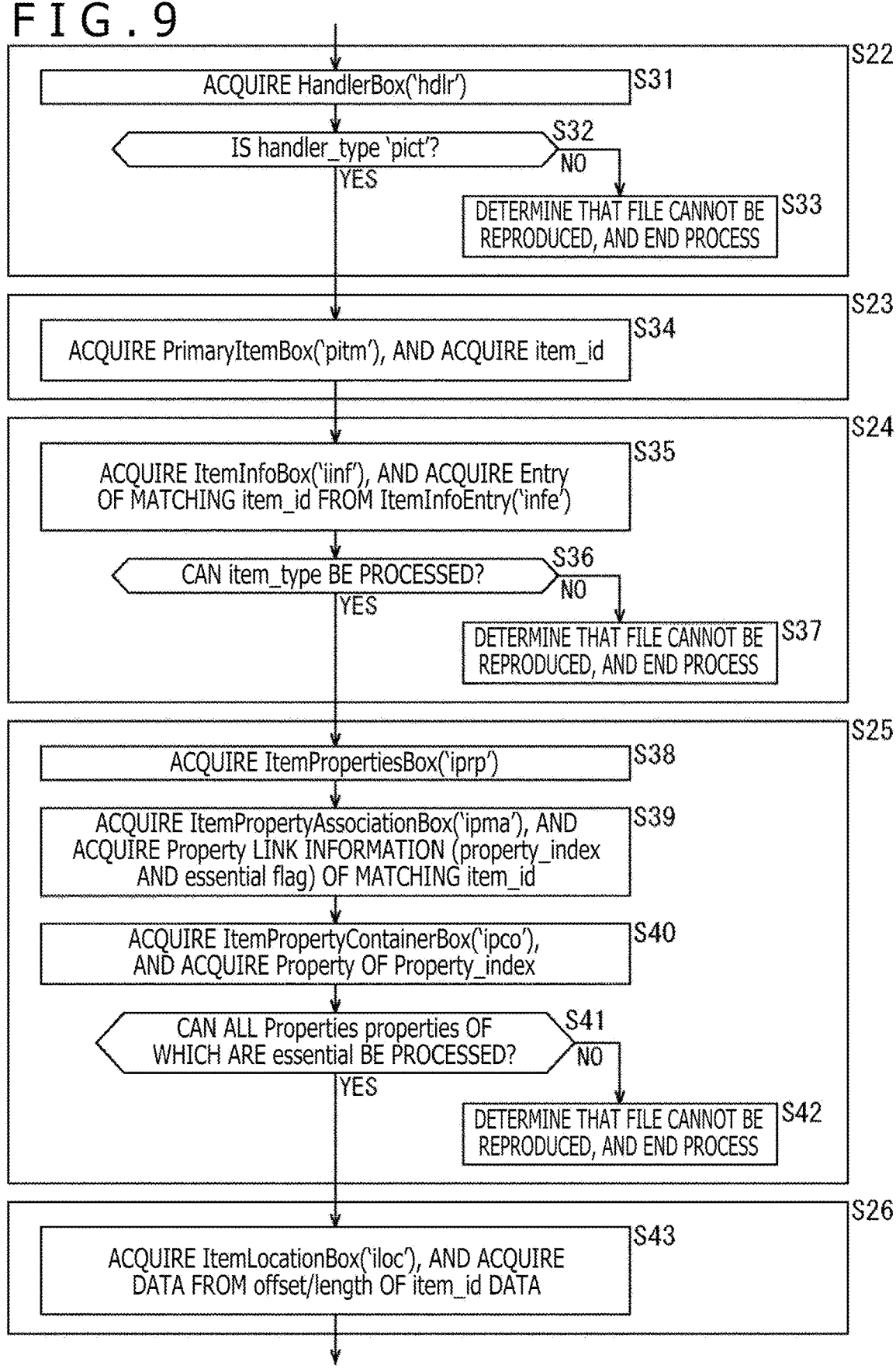
FIG. 9 is a flowchart for explaining a meta Box process in step S11 in FIG. 8.

FIGS. 8 and 9 each represent a flowchart for explaining a reproduction process of reproducing a file in the V-PCC still image format (1-item version) depicted in FIG. 6. It is to be noted that the reproduction processes depicted in FIGS. 8 and 9 is executed by a data analysis/decoding section 53 in FIG. 41, which will be described later. The data analysis/decoding section 53 includes a file analysis section 55, a decoding section 56, and a display information generation section 57.

In step S11, the file analysis section 55 executes Image file processing to acquire reproduction data, and supplies the reproduction data to the decoding section 56.

Here, the file analysis section 55 executes, as the Image file processing, a meta Box process depicted in FIG. 6 to acquire meta Box('meta') in step S21. Then, the file analysis section 55 executes a first reproduction feasibility determination process in step S22, a reproduction Item decision process in step S23, a second reproduction feasibility determination process in step S24, a third reproduction feasibility determination process in step S25, and a reproduction data acquisition process in step S26, which will be explained later with reference to FIG. 9.

In step S12, the decoding section 56 decodes the reproduction data supplied from the file analysis section 55 in step S11 by executing a decoding process. For example, the decoding section 56 can execute the decoding process by using Property of 'vpcC' necessary for decoding from Property acquired by the third reproduction feasibility determination process in step S25 (see step S40 which will be explained later), and by using data acquired by the reproduction data acquisition process in step S26 (see step S43 which will be explained later). Then, the decoding section 56 supplies a point cloud reconstructed by the decoding process to the display information generation section 57. For example, in the file example depicted in FIG. 6, Property of 'vpcC' is used.

In step S13, the display information generation section 57 executes a rendering process to render a display screen from the point cloud supplied from the decoding section 56 in step S12.

Figure 41:
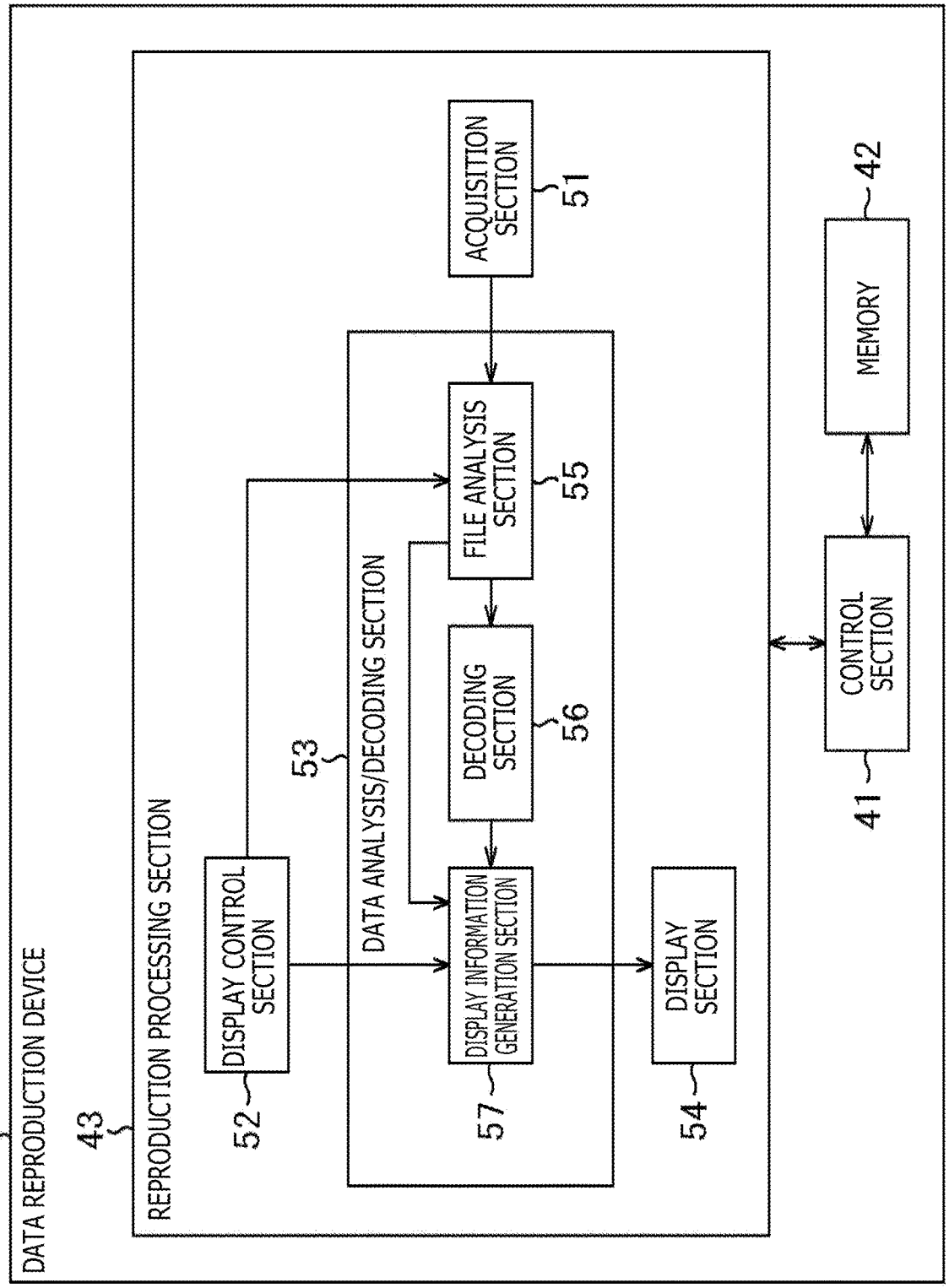
FIG. 41 is a block diagram depicting one example of a data reproduction device.

After a process in step S13, the display screen rendered by the display information generation section 57 is displayed on a display section 54 in FIG. 41.

FIG. 9 is a flowchart for explaining the meta Box process which is executed as the image file processing in step S11 in FIG. 8.

In the first reproduction feasibility determination process (process for HandlerBox('hdlr')) in step S22, processes in steps S31 to S33 are executed.

In step S31, the file analysis section 55 acquires HandlerBox('hdlr').

In step S32, the file analysis section 55 determines whether or not the handler_type of HandlerBox('hdlr') acquired in step S31 is 'pict'.

In a case where the file analysis section 55 determines, in step S32, that the handler_type is not 'pict', the process proceeds to step S33 is which it is determined that the file cannot be reproduced. Then, the process is ended. On the other hand, in a case where the file analysis section 55 determines, in step S32, that the handler_type is 'pict', the process proceeds to step S34.

In the reproduction Item decision process (process for PrimaryItemBox('pitm')) in step S23, a process in step S34 is executed.

In step S34, the file analysis section 55 acquires PrimaryItemBox('pitm'), and acquires item_id. For example, item_id=1 in the file example depicted in FIG. 6 is acquired.

In the second reproduction feasibility determination process (process for ItemInfoBox('iinf')) in step S24, processes in steps S35 to S37 are executed.

In step S35, the file analysis section 55 acquires ItemInfoBox('iinf'), and acquires, from ItemInfoEntry('infe') included in the ItemInfoBox('iinf'), Entry having an item_id that matches the item_id acquired in step S34. For example, Entry having the item_id=1 in the file example depicted in FIG. 6 is acquired.

In step S36, the file analysis section 55 determines whether or not item_type included in the Entry acquired in step S35 can be processed. For example, whether or not the item_type corresponds to vpc1 in the file example depicted in FIG. 6 is determined.

In a case where the file analysis section 55 determines, in step S36, that the item_type cannot be processed, the process proceeds to step S37 in which it is determined that the file cannot be reproduced. Then, the process is ended. On the other hand, in a case where the file analysis section 55 determines, in step S36, that the item_type can be processed, the process proceeds to step S38.

In the third reproduction feasibility determination process (ItemPropertiesBox('iprp') process) in step S25, processes in steps S38 to S42 are executed.

In step S38, the file analysis section 55 acquires ItemPropertiesBox('iprp').

In step S39, the file analysis section 55 acquires ItemPropertyAssociationBox('ipma'), and acquires Property link information (property_index and essential flag) having an item_id that matches the item_id acquired in step S34.

In step S40, the file analysis section 55 acquires ItemPropertyContainerBox('ipco'), and acquires Property having the Property_index acquired in step S39.

In step S41, the file analysis section 55 determines whether or not a process to handle all Properties the properties of which acquired in step S40 indicate essential can be performed. For example, whether or not a process to handle vpcC in the file example depicted in FIG. 6 can be performed is determined.

In a case where the file analysis section 55 determines, in step S41, that the process cannot be performed, the process proceeds to step S42 in which it is determined that the file cannot be reproduced. Then, the process is ended. On the other hand, in a case where the file analysis section 55 determines, in step S41, that the process can be performed, the process proceeds to step S43.

In the reproduction data acquisition process (ItemLocationBox('iloc') process) in step S26, a process in step S43 is executed.

In step S43, the file analysis section 55 acquires ItemLocationBox('iloc'), and acquires data from offset/length of item_id data indicated by the item_id acquired in step S34.

Thereafter, the meta Box process is ended, and then, the process proceeds to step S12 in FIG. 8.

As explained so far, the reproduction process of reproducing a V-PCC still image stream is basically similar to a process of reproducing a file in which HEVC or AVC is stored in an HEIF. However, a reproduction feasibility determination using vpc1 in ItemInfoBox('iinf') in the second reproduction feasibility determination process in step S24 and a reproduction feasibility determination using vpcC in the third reproduction feasibility determination process in step S25 are made. Reproduction of a V-PCC still image stream is characterized by these determinations. In addition, the decoding process in step S12 and the rendering process in step S13 are specific to V-PCC.

Meanwhile, since V-PCC is used in the reproduction process which has been explained with reference to FIGS. 8 and 9, the reproduction feasibility determination using 'vpc1' in ItemInfoBox('iinf') can be made, and further, a V-PCC profile or level can be recognized from 'vpcC' in ItemProperty.

Here, the decoding process in step S12 is focused. In the decoding process, video data units (a geometry image, a texture image, etc.) are decoded by an existing video image codec. In addition, a client makes the reproduction feasibility determination using 'vpcC'. Actually, however, merely the type of a codec is signaled by codec_ids included in an occupancy parameter set, a geometry parameter set, and an attribute parameter set.

For example, in HEVC, a reproduction feasibility determination is made on the basis of information regarding the HEVC Profile or Level included in HEVCConfigurationBox ('hvcC'). On the other hand, with 'vpcC' alone, information for making a reproduction feasibility determination such as the profile or level of each of the video data units included is lacking. Thus, a decoding process is actually needed, so that the process efficiency is expected to be deteriorated. Thus, reproduction feasibility information for Video data units needs to be signaled in order to enable a determination as to the feasibility of reproducing the video data units.

<Signaling of Reproduction Feasibility Information for Video Data Units>

First to third schemes of signaling of reproduction feasibility information for Video data units will be explained with reference to FIGS. 10 to 14.

In the first scheme, reproduction feasibility information for each Video data unit is signaled through ItemProperty with use of SampleEntry of Video. For example, ItemProperty('sube') can be defined, and signaling of a codec of each video data unit and decoder configuration information can be performed.

Figure 10:
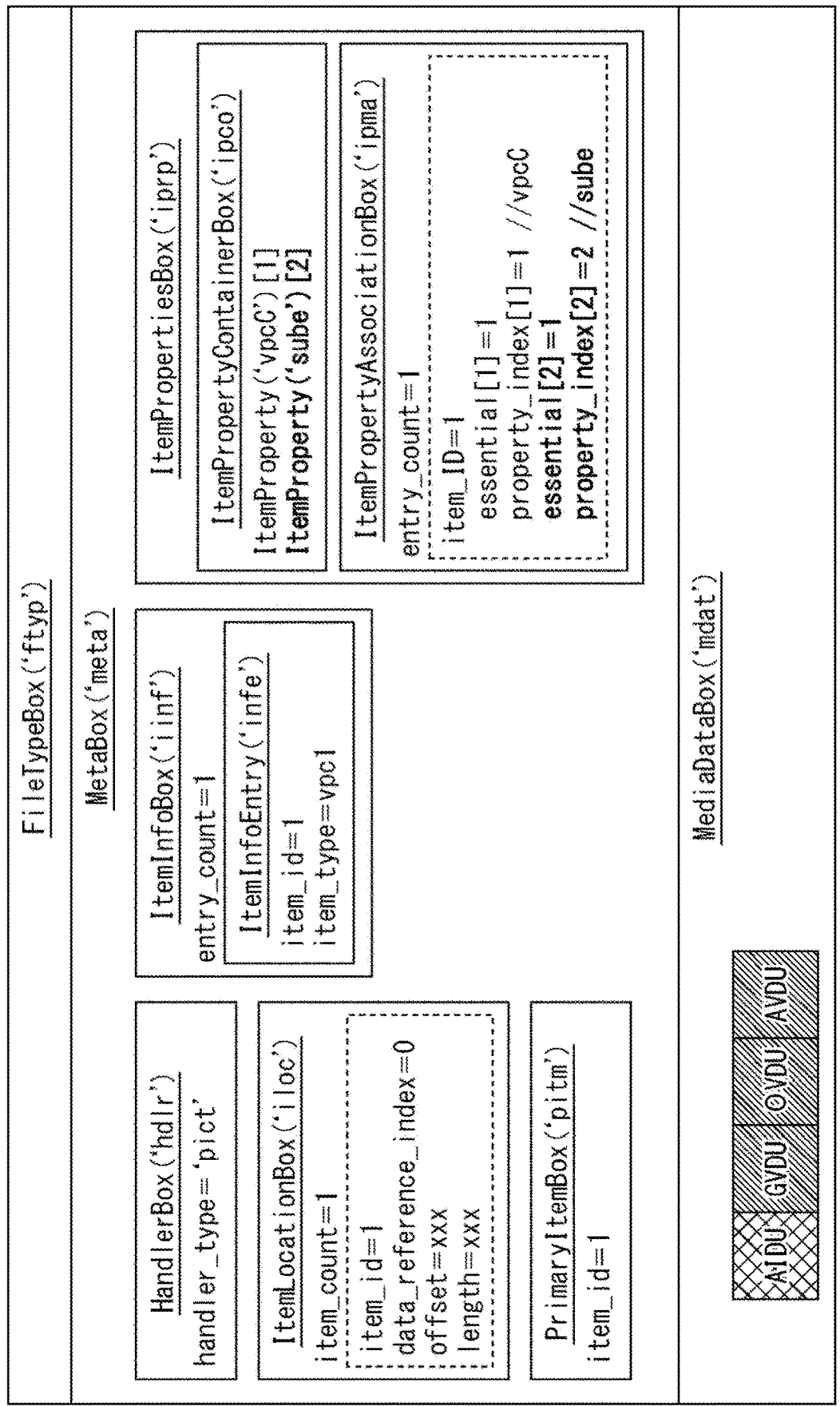
FIG. 10 is a diagram depicting one example of a file configuration of ItemProperty('sube') in a V-PCC still image format (1-item version).

FIG. 10 depicts an example in which ItemProperty ('sube') is added to the abovementioned file in FIG. 6

For example, ItemProperty('sube') is signaled through ItemPropertyContainerBox('ipco'), and ItemProperty ('sube') is associated with item_id=1 in ItepPropertyAssociationBox('ipma'), as depicted in bold in FIG. 10.

In FIG. 10, the essentail flag is set to 1 which indicates that the Property needs to be processed for sure. It is to be noted that the essential flag is set to 1 in the example in FIG. 10, but if the essential flag is set to 0, a reproduction process can be permitted even for an apparatus that is incapable of handling this ItemProperty. Further, an association with ItemProperty('sube') is made through property_index[2].

FIG. 11 depicts a structure example of ItemProperty ('sube'). In addition, FIG. 12 depicts one definition example of data_type, and FIG. 13 depicts one definition example of attribute_type.

For example, componentSampleEntryBox the number of which is equal to the number of video data units included in V-PCC is included in SubSampleEntryProperty. Type information for identifying the component type (see FIG. 12) of a video data unit is stored in the type field in each componentSampleEntryBox. Further, in a case where the component type of a video data unit is an attribute, attribute type information (see FIG. 13) for identifying the attribute type in an attribute_type field and SampleEntry of the video data unit are stored. In addition, SampleEntry( ) changes according to an encoding codec of the component, and is set to HEVCSampleEntry, for example, if the component is HEVC encoded.

As a result of signaling of reproduction feasibility information for Video data units according to the first scheme, a reproduction feasibility determination using SubSampleEntryProperty can be made in step S25 (see FIG. 8 mentioned above) of the reproduction process by the client. In addition, when the SampleEntry information signaled through the SubSampleEntryProperty is processed during the reproduction, a reproduction feasibility determination using Profile or Level information, and further, Parameter Set information, etc., in addition to a codec of each video data unit, can be made.

It is to be noted that only the type and the attribute type are signaled in the example depicted in FIG. 11, but layer identification information, identification information for the same attribute_type, and the like may be also signaled, for example.

In the second scheme, reproduction feasibility information for each Video data unit is signaled by using an existing ItemPropertyEntry. That is, signaling using the structure of ItemProperty can be performed by the second scheme, whereas signaling using the structure of SampleEntry for reproduction feasibility information for each Video data unit is performed by the abovementioned first scheme.

FIG. 14 depicts one example of a syntax.

ItemProperty that has already been defined by an HEIF is used as that for reproduction feasibility information, as depicted in bold in FIG. 14. For example, in a case where the video image codec of a Video data unit is HEVC, ItemProperty('hvcC') and ItemProperty('ispe') are included in Sub-ItemProperty.

In the third scheme, reproduction feasibility information for each Video data unit is signaled through V-PCC Profile/Level. For example, the signaling can be performed through Profile/Level in VPCCConfigurationBox('vpcC') depicted in FIG. 7, for example.

For example, when Profile and Level are decided in the following manner, a reproduction determination of a Video data unit being used can be made with VPCCConfigurationBox('vpcC') only.

Profile 1: main (hevc) profile
    The entire V-PCC is a main profile
    A Video data unit uses an HEVC codec (main profile) only
Profile 2: main (avc) profile
    The entire V-PCC is a main profile
    A Video data unit uses an AVC codec (high profile) only
Level 1
    The V-PCC level is 1.
    Up to HEVC Level 4 if HEVC is used
    Up to AVC Level 4 if AVC is used
Level 2
    The V-PCC level is 2.
    Up to HEVC Level 5 if HEVC is used
    Up to AVC Level 5 if AVC is used It is to be noted that, since a combination of the profile and the level of a codec of a video data unit is defined in the third scheme, any profile or level other than the defined ones cannot be used, and it is thus considered that the degrees of freedom of the codec, profile, and level of the video data unit are lowered.

Next, a V-PCC still image format (multi item version) will be explained with reference to FIGS. 15 and 16.

For example, Tracks are used as items on the basis of a V-PCC video format having the file structure depicted in FIG. 3 mentioned above, whereby mapping on a V-PCC still image format can be performed. Specifically, the tracks of PCC metadata, geometry, a texture (attribute), and an occupancy in FIG. 3 are used as image items. In addition, EntityToGroupBox which indicates an entry point of content reproduction is already included in Metabox, and thus, is used as it is.

Figure 15:
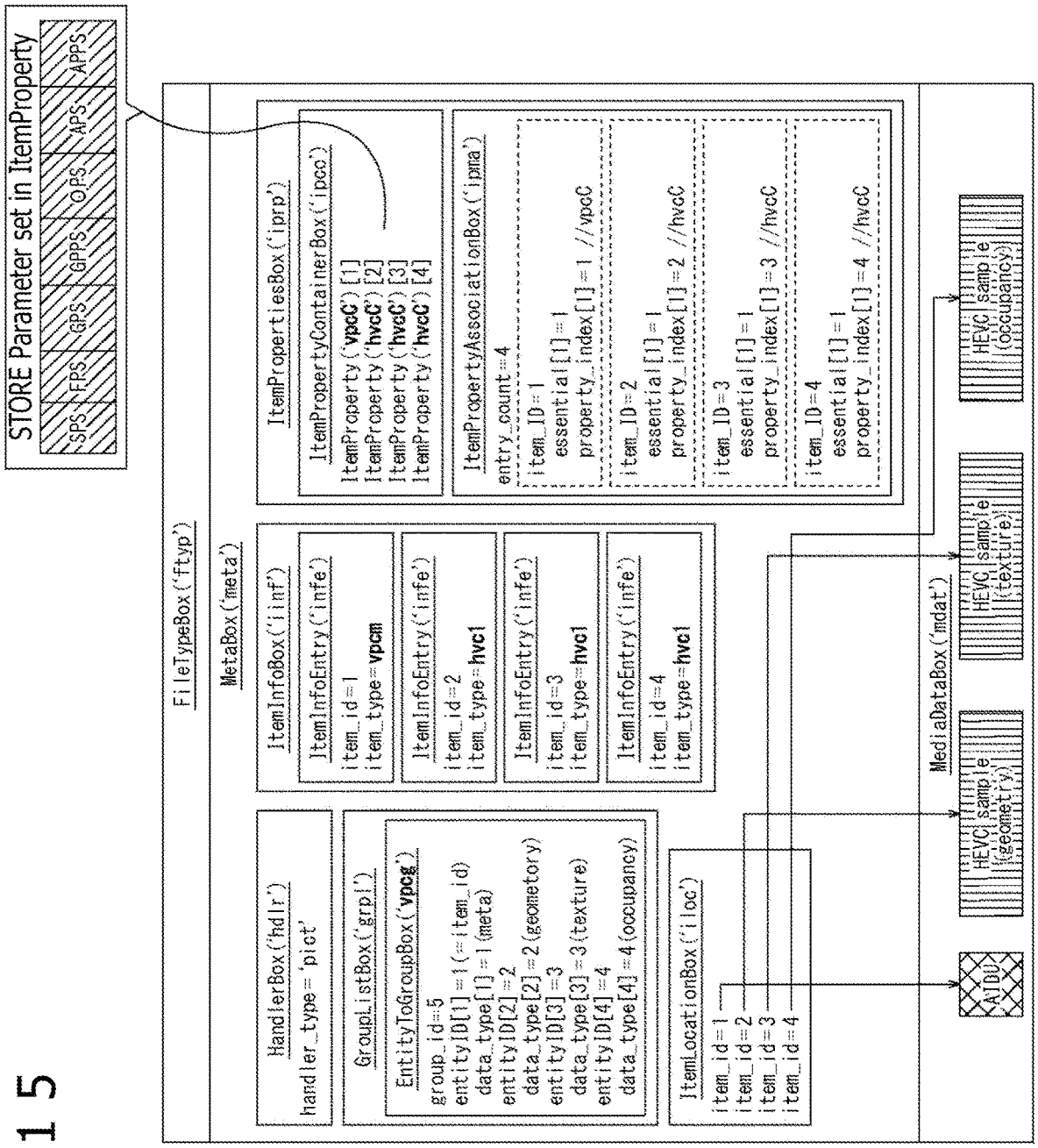
FIG. 15 is a diagram depicting one example of a file configuration (multi item version) of a V-PCC still image stream.

FIG. 15 depicts an example in which mapping is actually performed on a V-PCC still image format. In this example, each Video data is encoded by HEVC.

For example, the PCC Metadata Track in FIG. 3 is mapped on item_id=1 in ItemInfoEntry depicted in FIG. 15. As item_type, 'vpcm' which indicates that the track includes PCC Metadata only is signaled. ItemProperty of item_id=1 is associated with 'vpcC'. Various Parameter Sets are entered in 'vpcC', which has a structure the same as that depicted in FIG. 7, for example. As the Item Data, only an Auxiliary Information Data unit is stored.

In addition, the Geometry track in FIG. 3 is mapped on the Image item of item_id=2 in ItemInfoEntry depicted in FIG. 15. For example, an existing method for storing Image data by an HEVC codec defined by an HEIF can be used as it is.

In addition, the Texture track in FIG. 3 is mapped on the Image item of item_id=3 in ItemInfoEntry depicted in FIG. 15. For example, an existing method for storing Image data by an HEVC codec defined by an HEIF can be used as it is.

In addition, the Occupancy track in FIG. 3 is mapped on the Image item of item_id=4 in ItemInfoEntry depicted in FIG. 15. For example, an existing method for storing Image data by an HEVC codec defined by an HEIF can be used as it is.

Here, in FIG. 15, EntityToGroup Box('vpcg') which indicates an entry point is used as it is, as in FIG. 3. An item included in V-PCC content and the data_type of the item are stored in EntityToGroup Box. For example, in FIG. 15, regarding item_id=1, 2, 3, 4 as one V-PCC content, item_id=1 indicates metadata, item_id=2 indicates a geometry, item_id=3 indicates a texture, and item_id=4 indicates an occupancy.

Figure 16:
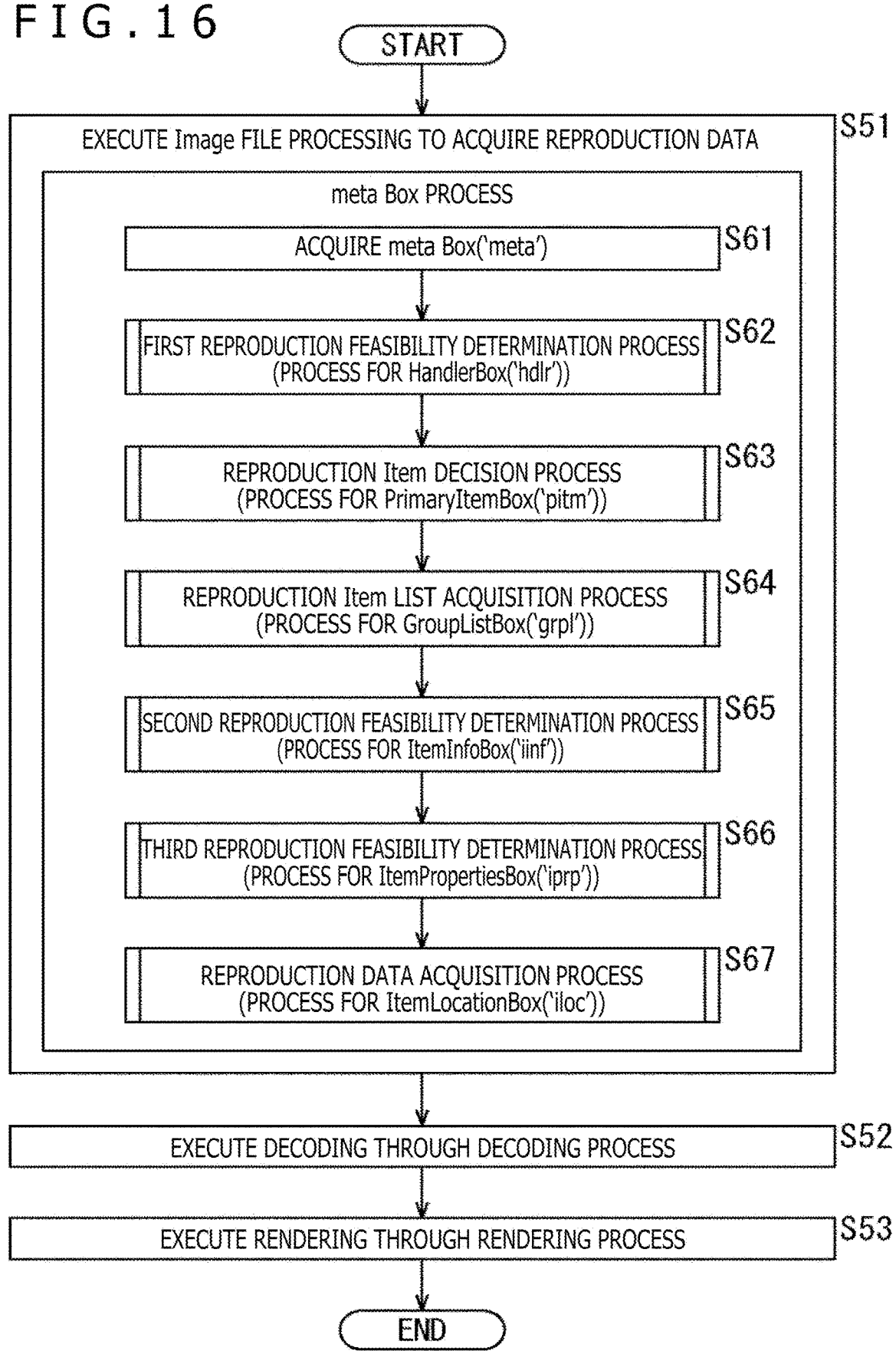
FIG. 16 is a flowchart for explaining a reproduction process of a V-PCC still image stream (multi item).

FIG. 16 depicts a flowchart for explaining a reproduction process of reproducing a file in the V-PCC still image format (multi item version) depicted in FIG. 15.

In the reproduction process depicted in FIG. 16, processes in steps S61 to S63 that are similar to steps S21 to S23 in FIG. 8 are executed, and processes is steps S65 to S67 that are similar to steps S24 to 26 in FIG. 8 are executed. Further, processes in steps S52 and S53 that are similar to steps S12 and 13 in FIG. 8 are executed.

That is, the reproduction process depicted in FIG. 16 differs from the reproduction process in FIG. 8 in that a reproduction Item list acquisition process (process for GroupListBox('grpl')) is added in step S64. Further, the reproduction process depicted in FIG. 16 differs from the reproduction process in FIG. 8 in that the processes of ItemInfoBox('iinf'), ItemPropertiesBox('iprp'), and ItemLocationBox('iloc') need to be performed by the number of times equal to the number of items.

Meanwhile, a client cannot recognize a reproduction start point in the V-PCC still image format (multi item version).

That is, is the reproduction process having been explained with reference to FIG. 16, a reproduction start point is assumed to be signaled through PrimaryItemBox. However, PrimaryItemBox can only indicate an item to be reproduced first. Therefore, is the structure depicted in FIG. 15, a group indicated by EntityToGroup Box('vpcg') should become a reproduction start point, but cannot be signaled in the current format.

Accordingly, signaling of a reproduction start point needs to be performed in a manner as described later so as to allow the client to recognize the reproduction start point.

In addition, with the V-PCC still image format item version), Image data having been decoded in the Decoding process cannot be associated with respective V-PCC parameter sets, so that the client cannot reconstruct the point cloud.

That is, with only one Geometry item, one Attibute item, and one Occupancy item, as depicted in FIG. 15, association with a Parameter Set included in ItemProperty('vpcC') of a metadata item is possible. However, a plurality of Layers of Geometry images can be held, for example. In this case, a Geometry item is included in each Layer, and thus, Geometry Parameter Sets in the respective Layers are included in the Metadata item. However, since the respective Geometory items are not associated with Geometer y Paramaeter Sets in the Metadata item, a point cloud cannot be reconstructed. It is to be noted that the same applies to a case of Video.

Thus, signaling for reconstructing a point cloud needs to be performed as explained later, so as to allow a client to reconstruct a point cloud.

In addition, with a V-PCC still image format (multi item version), the client can reproduce each image item singly.

That is, in the V-PCC still image format (multi item version), when the client that cannot process V-PCC but can reproduce an HEVC image processes the data in FIG. 15, the client can recognize that items of an HEVC Image are indicated by item_id=2, item_id=3, and item_id=4. Accordingly, the HEVC image can be reproduced. In a case where each Image item is reproduced singly in such a manner, an image in the extended state depicted in FIG. 2 is directly displayed. Such display needs to be avoided.

To this end, signaling for avoiding reproduction of each single Item needs to be performed, as explained later, so that the client is inhibited from reproducing each Image item singly.

<Signaling of Reproduction Start Point>

First to third schemes of signaling a reproduction start point will be explained with reference to FIGS. 17 to 20.

In the first scheme, Primary item Box is extended to perform signaling of a reproduction start point.

For example, in a case where a reproduction start point is indicated by a group in the EntityToGroup Box('vpcg'), as depicted in FIG. 15 mentioned above, signaling of the reproduction start point using a Primary item box is permitted.

Specifically, as depicted in bold in FIG. 17, version=2 in PrimaryItemBox is added to permit signaling of group_id indicated in EntityToGroup Box.

In addition, in a modification of extending PrimaryItemBox, the syntax of the original PrimaryItemBox is not changed, but semantics is changed so as to indicate group_id by a 32-bit item_ID. Specifically, the name item_ID of PrimaryItemBox is changed to entity_ID such that both item_id and group_id can be used. Here, in order to clearly indicate that group_id is used, ('pitm', version, flags) may be set, and flags&1 may be set to 1.

In the second scheme, signaling of a reproduction start point is performed through a new box.

For example, in a case where a reproduction start point is indicated by a group in EntityToGroup Box('vpcg'), as depicted in FIG. 15 mentioned above, signaling of the reproduction start point is performed through a new Box indicating the start point.

Specifically, PrimaryGroupBox('pgrp') is defined, as depicted in FIG. 18, and the Box indicates a group that is a start point to be reproduced first. Accordingly, in the case where this box is included, the client acquires group_id from the box, and searches for EntityToGroup Box that matches the group_id, whereby reproduction from the start point can be performed.

For example, in place of the process of PrimaryItemBox (step S63) in the reproduction process having been explained with reference to FIG. 16 mentioned above, the process of PrimaryGroupBox in FIG. 18 can be executed such that the reproduction can be performed.

In the third scheme, the structure of a file configuration (multi item version) of a V-PCC still image stream is changed such that a reproduction start point is set as an item.

For example, the reproduction start point is indicated without extending the existing PrimaryItemBox, by using not EntityToGroupBox but a metadata item as a reference source using ItemReference and by indicating another item as a reference destination and setting the item_id of the reference source item as a start point. That is, the item_id of the metadata item in PrimaryItemBox is signaled.

Specifically, ItemReference is used, as depicted in FIGS. 19 and 20. New ItemReference('vpcg') is defined, and an association of the metadata item with Geometry, Attribute, and Occupancy items is made to indicate one V-PCC content. Further, information signaled in EntityToGroupBox is signaled through VPCCMultiItemProperty. It is to be noted that the type and the attribute_type are defined in a manner similar to those in FIGS. 12 and 13.

In the abovementioned manner, the structure of the file configuration (multi item version) of a V-PCC still image stream is changed, so that a metadata item of a reproduction start point can be acquired first, and then, ItemReference ('vpcg') can be acquired.

For example, in place of the process of GroupListBox (step S64) in the reproduction process having been explained with reference to FIG. 16 mentioned above, the process of ItemReference in FIG. 20 is performed to obtain a list of necessary Items.

<Signaling for Reconstruction of Point Cloud>

First to third schemes of signaling for reconstructing a point cloud will be explained with reference to FIGS. 21 to 25.

In a V-PCC still image format (multi item version), a Geometry item, an Attibute item, and an Occupancy item cannot be associated with Parameter Sets included in ItemProperty('vpcC') of a metadata item, as explained above, so that a point cloud cannot be reconstructed. It is to be noted that, also in a V-PCC video format depicted in FIG. 3, a point cloud cannot be reconstructed. Thus, information equivalent to ImageProperty information to be extended as explained in the present embodiment is put below SampleEntry or schemeInfomationBox of each Track in FIG. 3, or signaling thereof is performed by the mechanism of Track Group, Sample Group, or EntityToGroup. Accordingly, a point cloud can be reconstructed.

In the first scheme, in order to reconstruct a point cloud, new ItemProperty is added to a Geometry item, an Attribute item, and an Occupancy item.

Figure 22:
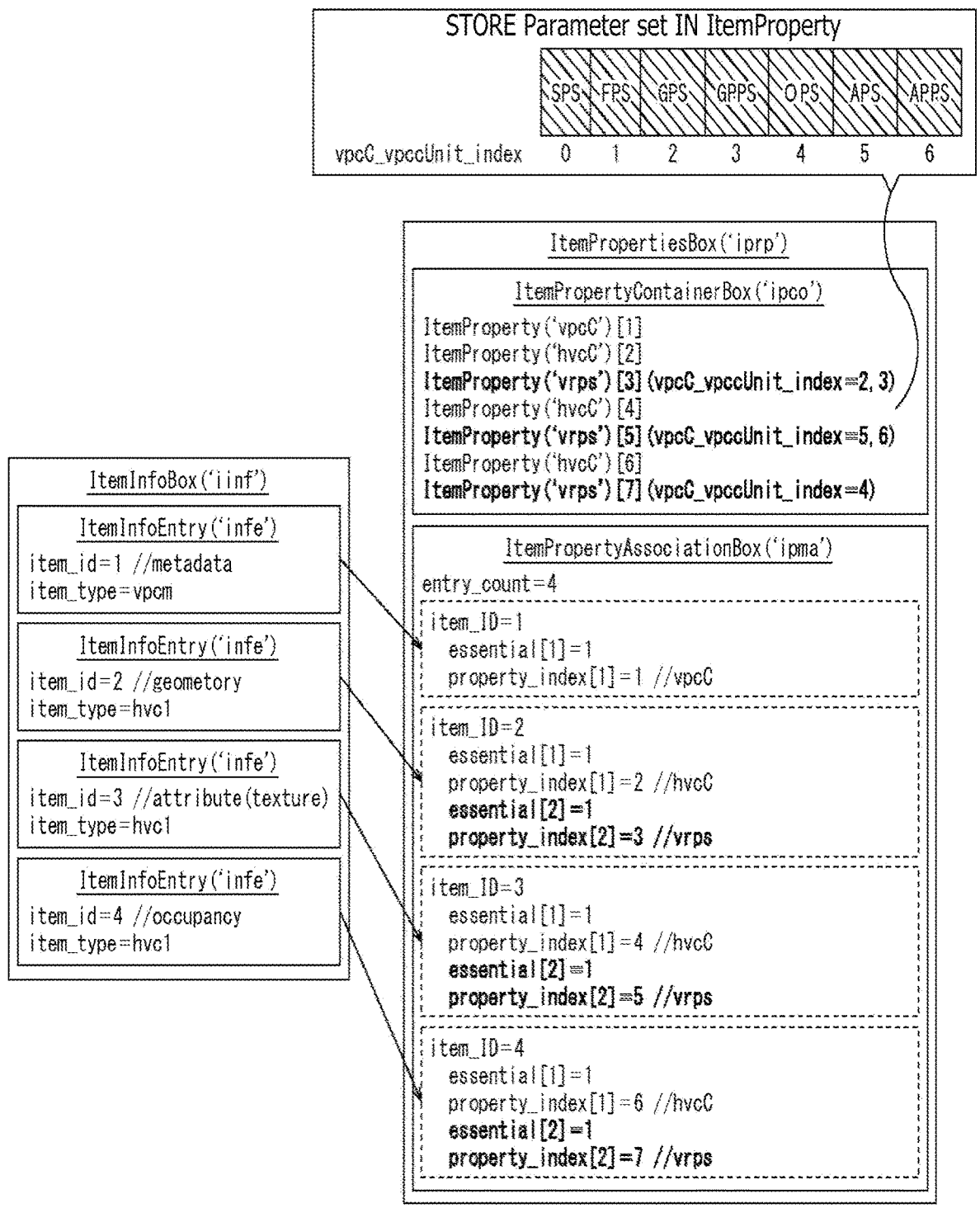
FIG. 22 is a diagram depicting one example of a structure of ItemProperty using the syntax in FIG. 21.

FIG. 21 depicts the syntax of new ItemProperty('vrps') to be added. FIG. 22 depicts the structure of ItemProperty when the above syntax is used.

First, Parameter Sets that need to be associated with a Geometry item, an Attibute item, and an Occupancy item for reconstruction of a point cloud are stored in ItemProperty ('vpcC') which is used in a metadata item (item_id=1 in FIG. 22). ItemProperty('vpcC') has the structure depicted in FIG. 7. Here, index numbers starting from 0 are assigned according to the order of being stored in vpccUnit stored in ItemProperty('vpcC'). These numbers are referred to as vpcC_vpccUnit_index. ItemProperty('vrps') stores a list of Parameter Sets that need to be associated with a Geometry item, an Attibute item, and an Occupancy item for reconstruction of a point cloud. Here, the association is made on the basis of vpcC_vpccUnit_index.

By the first scheme, Parameter Sets necessary to reconstruct a point cloud can be uniquely identified in the abovementioned manner. Accordingly, the point cloud can be reconstructed.

For example, during the Decoding process (step S12) in the reproduction process having been explained with reference to FIG. 16 mentioned above, Parameter Sets are identified according to ItemProperty('vrps') and ItemProperty('vpcC') of a metadata item extended by the first scheme, and are used to reconstruct the point cloud.

In addition, in a case where the first scheme is used for a video format, vpccReferenceParameterBox('vrps') that has a field similar to that of ItemProperty('vprs') is defined, and is stored in geometry, attribute, and occupancy tracks, for example. Accordingly, the first scheme can be executed.

In the second scheme, a V-PCC unit header is signaled in order to reconstruct a point cloud.

For example, in the second scheme, ItemProperty('vuhd') for signaling a vpcc_unit_header is signaled is a manner similar to ItemProperty('vrps') in the abovementioned first scheme.

FIG. 23 depicts the syntax of ItemProperty('vuhd').

Thus, the second scheme has a feature of signaling a vpcc_unit_header which is signaled in a bitstream of a V-PCC still image format (1-item version), but is not signaled in a bitstream of a V-PCC still image format (multi item version). Therefore, a V-PCC still image format (multi item version) can easily be restored to a bitstream of a V-PCC still image format (1-item version). As a result, reconstruction of a point cloud can also be achieved.

It is to be noted that, in the second scheme, a vpcc_unit_header is signaled, but a part of vpcc_unit_payload may be included.

In addition, in a case where the second scheme is used for a video format, for example, vpccUnitHeaderBox('vuhd') having a field similar to that of ItemProperty('vuhd') is defined, and is stored in geometry, attribute, and occupancy tracks. Accordingly, the second scheme can be implemented.

In the third scheme, Parameter Sets are signaled by respective Items in order to reconstruct a point cloud.

For example, in the third scheme, Parameter Sets to be referred to for a Geometry item, an Attibute item, and an Occupancy item are signaled through ItemProperty of the respective items. Accordingly, the Geometry item, the Attibute item, and the Occupancy item are associated with the Parameter Sets necessary to reconstruct a point cloud.

Figure 25:
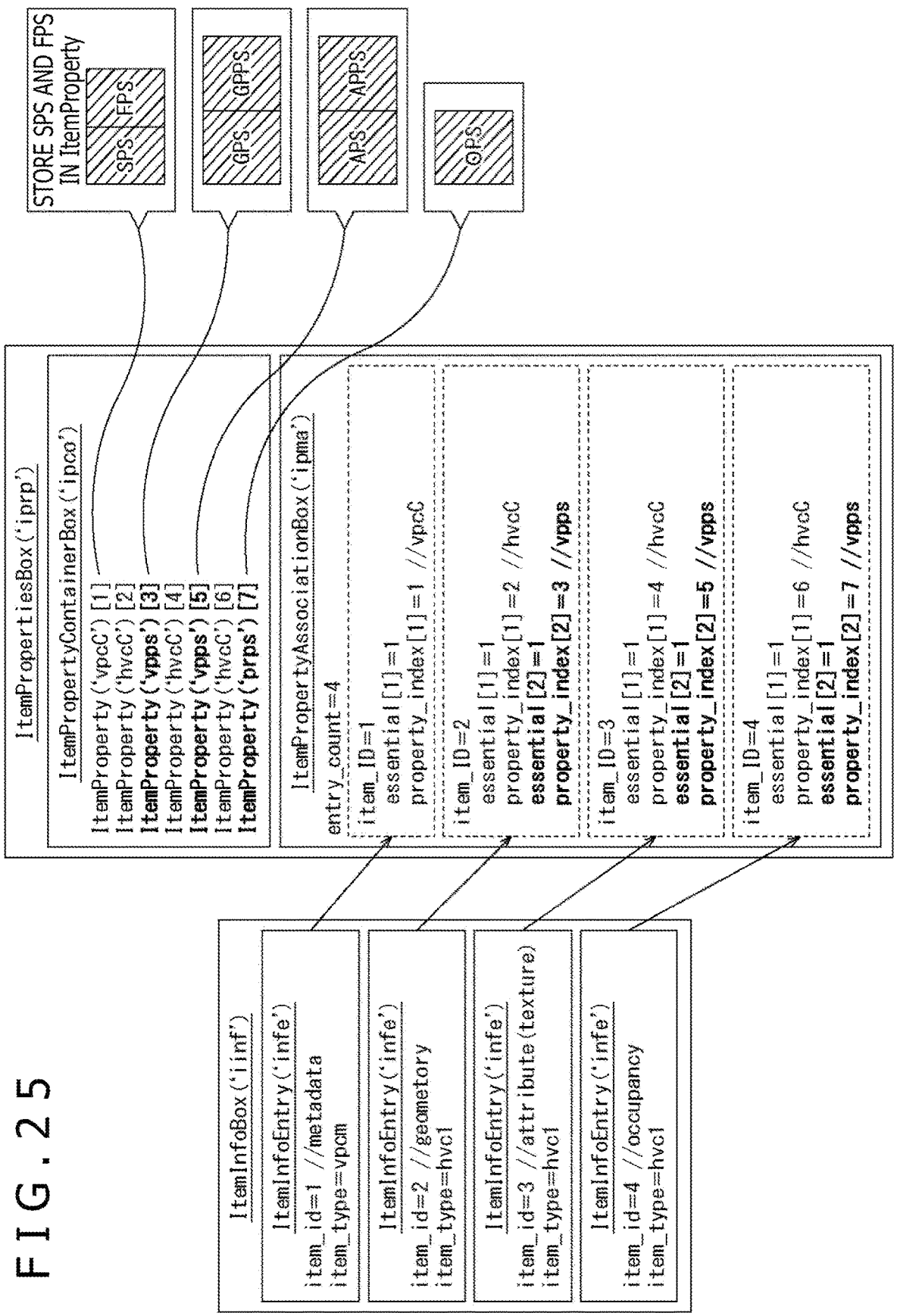
FIG. 25 is a diagram depicting one example of a file configuration using the syntax in FIG. 24.

FIG. 24 depicts the syntax of ItemProperty('vpss'). FIG. 25 depicts the structure of ItemProperty when the above syntax is used.

As depicted in FIG. 25, newly defined vpccParameterSetProperty has a syntax obtained by extracting a part of ItemProperty('vpcC') for signaling of parameter sets. For example, the geometry item of item_id=2 is associated with ItemProperty('vpss')[3]. Further, ItemProperty('vpss') [3] includes Geometry Parameter Set (GPS) and Geometory Patch Parameter Set (GPPS). To reconstruct a point cloud, ItemProperty('vpss') [3] is combined, whereby the reconstruction can be implemented.

It is to be noted that, in the third scheme, in ItemProperty ('vpcC') [1], a Parameter Set signaled through ItemProperty ('vpss') is not signaled, but may be included. Also in that case, to reconstruct a point cloud, a Parameter Set that is associated with item is used.

In addition, in a case where the third scheme is used for a video format, for example, vpccParameterSetBox('vpss') that has a field similar to that of ItemProperty('vpss') is defined, and is stored in geometry, attribute, and occupancy tracks.

<Signaling for Preventing Reproduction of Single Item>

First and second schemes for signaling to prevent reproduction of a single Item will be explained with reference to FIGS. 26 to 29.

In the first scheme, in order to inhibit the client that can reproduce an HEVC Image from reproducing a Geometory item singly, an Attirbute item singly, or an Occupancy item singly, signaling of ItemProperty which indicates a Restricted scheme is performed.

For example, a state in which an Item uses an existing Codec but a certain limitation is imposed thereon is signaled with use of ItemInfoEntry and ItemProperty.

First, an item itself indicates a limitation imposed on display. To indicate the limitation, the item_type of IntemInfoEntry is set to 'resi'. Here, OriginalFormatPeoperty is defined because the original item_type becomes unrecognizable. In addition, to indicate what type of limitation is imposed, SchemeTypeProperty is defined.

FIG. 26 depicts a structure example of OriginalFormatPeoperty. FIG. 27 depicts a structure example of SchemeTypeProperty.

For example, as depicted in FIG. 26, the data_format of ItemProerty('frma') is 'hvc1' for an HEVC Image, for example.

In addition, as depicted in FIG. 27, for example, "pvcc" is signaled in order to indicate that the scheme_type of ItemProperty('schm') is an item for vpcc. In the remaining fields, 1 is set for shcme_version, and scheme_uri is not used.

Figure 28:
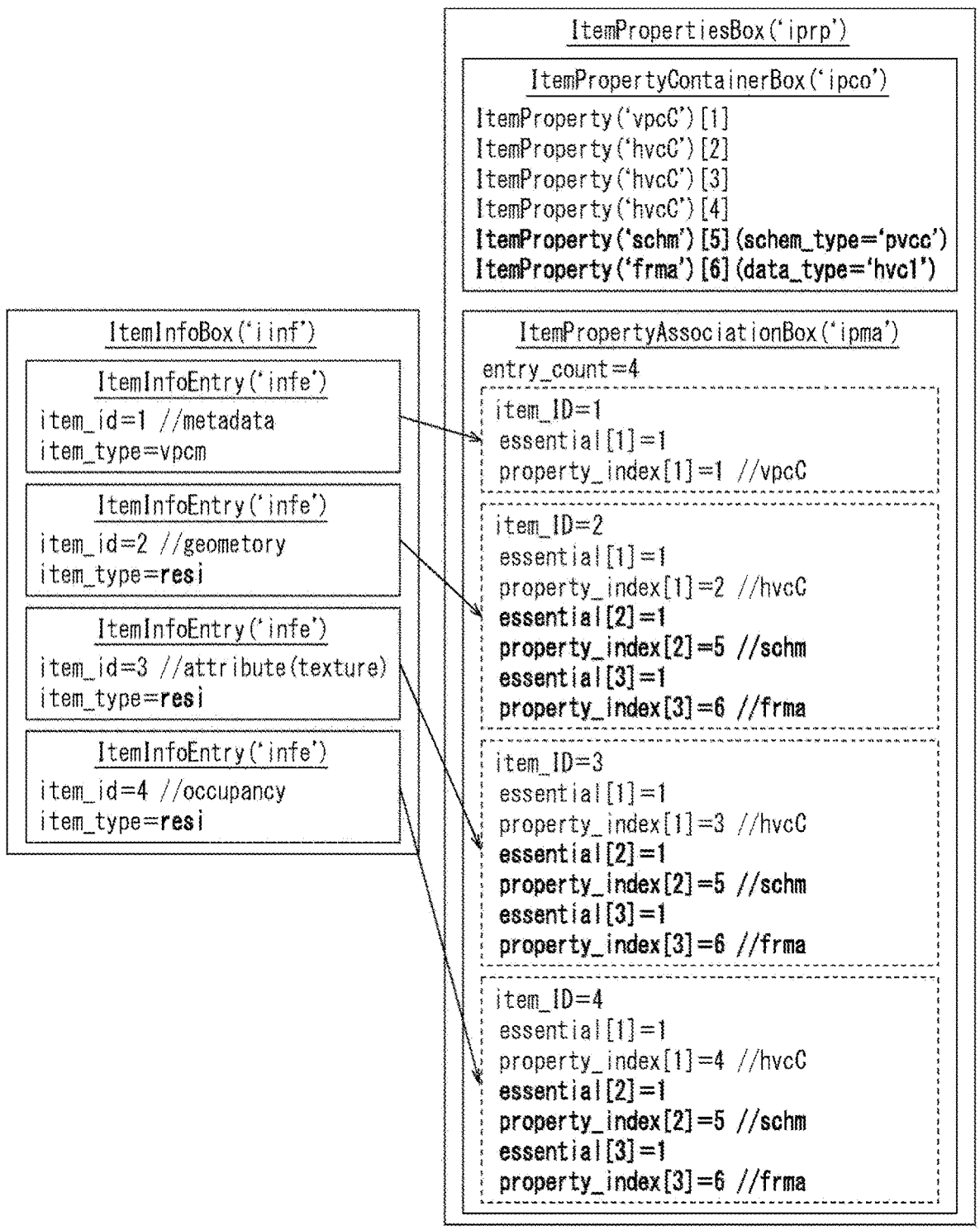
FIG. 28 is a diagram depicting one example of a file configuration using a Restricted scheme.

FIG. 28 depicts an example of using item_type='resi', ItemProerty('frma'), and ItemProperty('schm').

As depicted in FIG. 28, Geometory item(item_id=2), Attirbute item(item_id=3), and Occupancy item(item_id=4) are each associated with itemProerty('frma') and ItemProperty('schm').

It is to be noted that, in a modification, only ItemProperty ('schm') may be used without using item_type=resi and ItemProerty('frma'). In that case, Restricted scheme is determined from ItemProperty('schm') alone.

Further, at the same time, flag&1=1 may be set in ItemInfoEntry, and signaling to indicate a hidden image may be performed.

For example, the first scheme uses an existing Codec, but signaling that can be commonly used for a still image item, which requires a special process in rendering, is performed.

In the second scheme, in order to inhibit a client that can reproduce an HEVC Image from reproducing a Geometry item, an Attirbute item, and an Occupancy item singly, ItemProperty indicating V-PCC is signaled.

For example, in the second scheme, ItemProperty indicating that an Image item is a part of data in V-PCC is added to inhibit any client that cannot process the ItemProperty from performing reproduction.

Here, it is sufficient if VPCCMultiItemProperty depicted in FIG. 19 mentioned above is signaled. In such signaling, the essential flag in ItemPropertyAssociationBox('ipma') depicted in FIG. 20 needs to be set to 1.

Then, as depicted in FIG. 29, VPCCMultiItemProperty is defined. This ItemProperty indicates which of Geometry, Attribute, and Occupancy is indicated by an Image item in a case where Multi Items constitute one V-PCC content.

It is to be noted that, since EntityToGroupBox enables identification that an Image item is Geometry, Attribute, or Occupancy, nothing may need to be signaled (empty ItemProperty).

Further, at the same time, flag&1=1 may be set in ItemInfoEntry, and signaling to indicate a hidden image may be performed.

<G-PCC Still Image Format>

Definition of a method of storing a G-PCC still image stream into an HEIF will be explained with reference to FIGS. 30 and 31.

First, a video image includes multiple PC frames that are successively displayed at a particular time interval. In contrast, in a G-PCC still image stream, one PC frame is sufficient and no time information is needed.

To store such a G-PCC still image stream into a file having a file structure using the ISOBMFF technology, metadata to be used for a reproduction feasibility determination and decoding or rendering is defined as ItemProperty, and is signaled through ItemPropertyBox('iprp'), in a manner similar to that of a V-PCC still image stream. In addition, data other than the metadata is Item data. For example, all the Parameter Sets are stored into ItemProperty, and all the Geom and Attr are stored as Item data.

Figure 30:
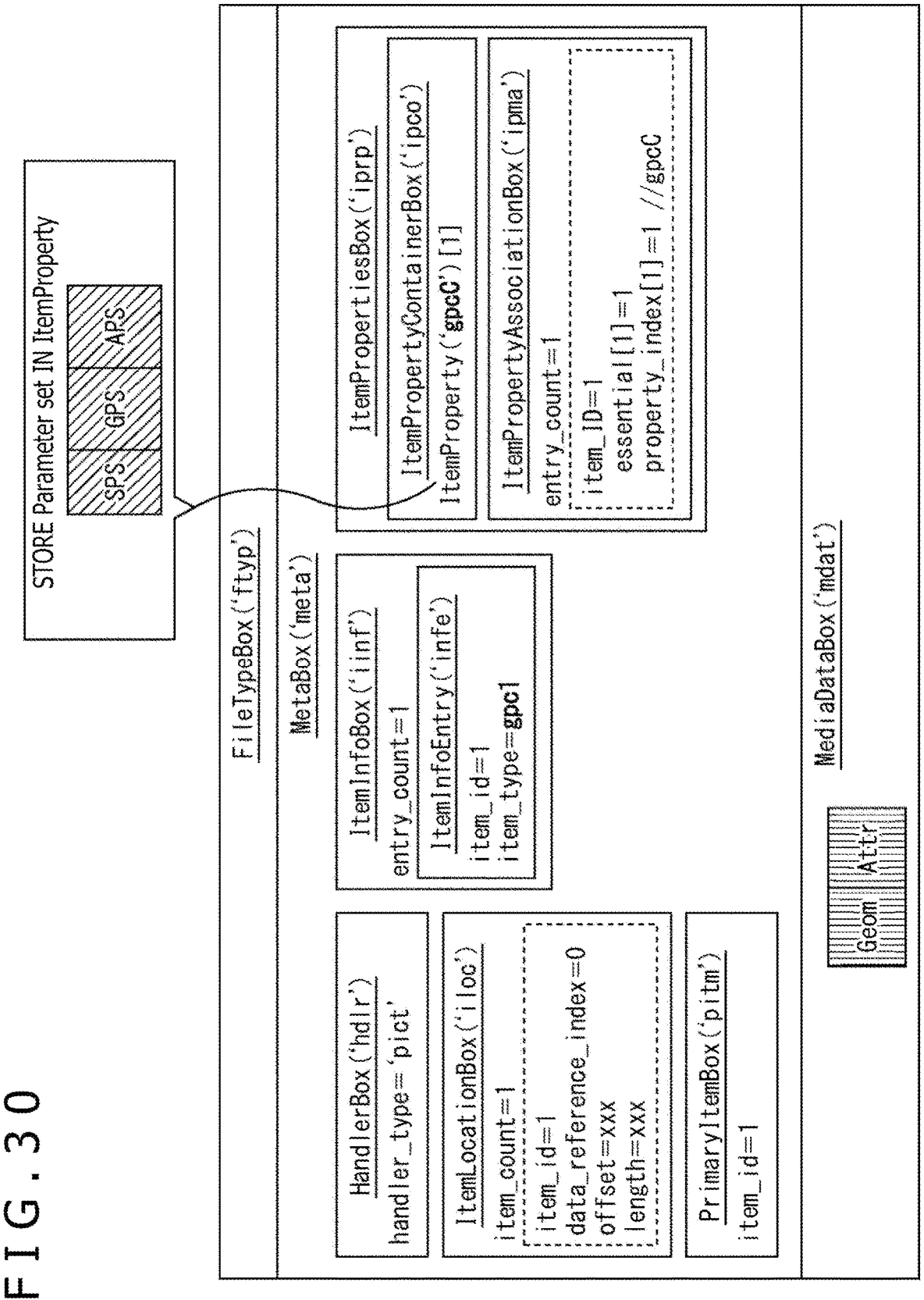
FIG. 30 is a diagram depicting one example of a file configuration of a G-PCC still image stream.

FIG. 30 depicts the file configuration of a G-PCC still image format.

First, the type of an Item is designated by ItemInfoEntry ('infe'). In the example depicted in FIG. 30, item_type='gpc1' is set. Data to be used for a reproduction feasibility determination and decoding/rendering is signaled as 'gpcC' in Item Property.

For example, gpcC has a structure depicted in FIG. 31.

Schemes for Efficiently Performing V-PCC/G-PCC Reproduction>

First and second schemes for efficiently implementing a use case of performing reproduction using a three-dimensional shape without using attribute information, or performing reproduction using a three-dimensional shape and some parts of attribute information in V-PCC/G-PCC will be explained with reference to FIGS. 32 to 39.

In order to efficiently perform V-PCC/G-PCC reproduction, SubSampleItemProperty is signaled in the first scheme.

For example, the first scheme can be used for both a V-PCC still image format (1-item version) and a G-PCC still image format. In the first scheme, partial access information regarding ItemData is signaled through SubSampleEntryProperty so as to easily determine and acquire a Video data unit to be used for reproduction.

FIG. 32 depicts SubSampleItemProperty based on an existing standard.

For example, a part of ItemData can be indicated as SubSample through SubSampleItemProperty based on an existing standard depicted in FIG. 32. However, what type of data the SubSample is cannot be recognized.

Thus, codec_specific_parameters are defined as depicted in FIGS. 33 to 35 such that partial access is permitted.

That is, when codec_specific_parameters are set as depicted in FIGS. 33 to 35, access to data can be efficiently made in both a V-PCC still image format (1-item version) and a G-PCC still image format.

It is to be noted that, although codec_specific_parameters are common in the examples in depicted in FIGS. 33 to 35, different definitions may be made for V-PCC and G-PCC by considering a future expandability, for example. In a case where such definitions are made, data_type=0(Auxiliary information data) and data_type=2(occupancy data) are reserved in G-PCC.

In the second scheme, in order to easily determine and acquire a Video data unit to be used for reproduction in a G-PCC still image format, signaling is performed with multi items.

For example, a G-PCC stream includes one geometry bitstream and a plurality of attribute bitstreams. Therefore, the bitstreams are stored as items such that access to necessary data can be efficiently made.

That is, in the second scheme, a geometory item is set as a base item, and includes all the Parameter Sets. Then, all the items each include GPCCMultiItemProperty indicating information regarding the multi items.

FIG. 36 depicts one example of the structure of GPCCMultiItemProperty.

For example, as in depicted in FIG. 36, is a case where an Item is a geometry item in GPCCMultiItemProperty, isGeometoryStream=1 is set. Further, num_attribute_bitstream indicates the number of attribute bitstreams included in the G-PCC stream. In a case where the Item is as attribute item, attribute_type indicating an attribute type (color, reflectance) is indicated. It is to be noted that the attribute_type is defined in a manner similar to that in FIG. 13.

Figure 37:
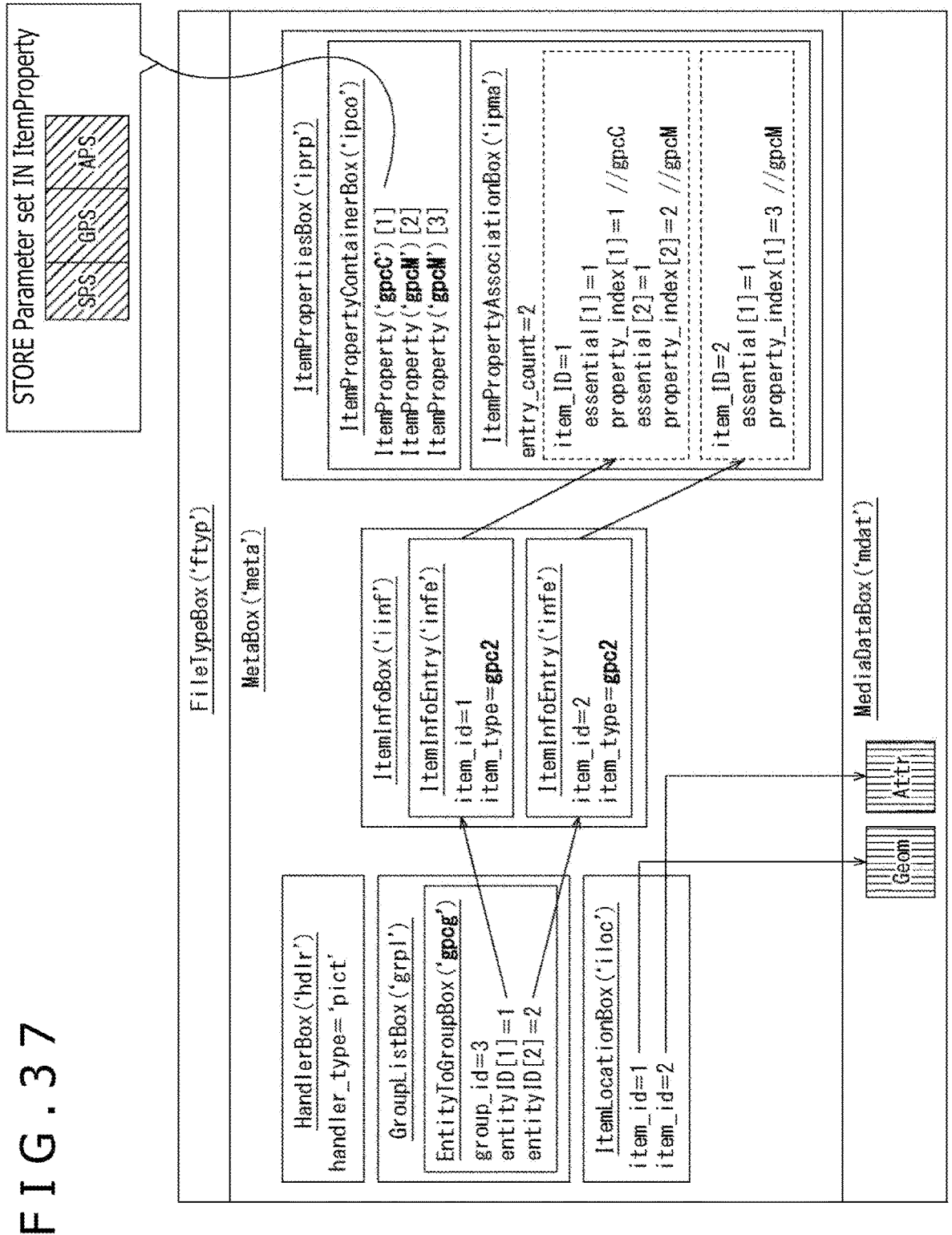
FIG. 37 is a diagram depicting one example of a G-PCC multi item a start point of which is EntityToGroupBox.

FIG. 37 depicts a file structure using GPCCMultiItemProperty.

As depicted in FIG. 37, first, item_type of ItemInfoEntry is set to 'gpc2' which indicates multi items. Then, item_id=1 indicates a Geometory Item, and has ItemProperty('gpcC') and ItemProperty('gpcM') as ItemProperties. In addition, ItemProperty('gpcC') has a structure the same as that in FIG. 31. Moreover, in ItemProperty('gpcM'), isGeometoryStream=1 and num_attribute_bistream=1 are set.

In addition, item_id=2 indicates a texture (attribute) item, and has itemProperty('gpcM') as ItemProperty. Moreover, in ItemProperty('gpcM'), isGeometoryStream=0 and attribute_type=0(texture) are set.

Then, a reproduction start point is indicated by EntityToGroupBox('gpcg'). In this case, as a scheme for indicating the reproduction start point, the abovementioned first and second schemes of signaling of a reproduction start point can be used.

It is to be noted that, in a modification, the abovementioned third scheme of signaling of a reproduction start point may be used, and, for example, ItemReference('gpcg') may be used based on a geometry item, as depicted in FIG. 38. This modification is different is that not EntityToGroupBox in FIG. 37 but ItemReference is used, but the remaining Boxes are similarly used.

In addition, in a modification of the schemes of efficiently performing V-PCC/G-PCC reproduction, a combination of Attributes to be used for reproduction can be signaled.

For example, if Attribute information is not used, only a three-dimensional shape can be displayed, and the colors and the transmittance can be indicated by texture information, Transparency information, etc. A client can perform reproduction by freely selecting an Attribute. However, a content owner wants rendering using minimum necessary Attributes for each content to be performed, but there is no signaling method therefor under the current circumstances.

Therefore, combination information for reproduction intended by a content owner is signaled through ItemProperty.

For example, as depicted in FIG. 39, a list of Attributes to be combined is signaled through ItemProperty.

As depicted in FIG. 39, selection information for Attributes only is indicated because a V-PCC/G-PCC geomeotry, a V-PCC occupancy, and auxiliary information are absolutely required to display a three-dimensional shape.

For example, selection_entry_count indicates the number of combinations of Attributes, and attribute_num indicates the number of attributes included in each combination. For example, attribute_num of 0 indicates that reproduction using no attribute is permitted. In addition, in a case where attribute_num is greater than 0, attributes included in the corresponding combination are indicated by attribute_type.

The combinations are indicated in this modification. Alternatively, whether reproduction is mandatory or optional may be simply indicated for each attribute. For example, information indicating whether reproduction is mandatory or optional for each attribute may be signaled with codec_specific_parameters in the first scheme of efficiently performing V-PCC/G-PCC reproduction, or with GPCCMultiItemProperty or EntityToGroupBox('gpcg') in the second scheme of efficiently performing V-PCC/G-PCC reproduction, for example.

In addition, in the file configuration (multi item version) of a V-PCC still image stream, the signaling may be performed through EntityToGroup Box('vpcg'), or through VPCCMultiItemProperty in the abovementioned third scheme of signaling a reproduction start point.

It is to be noted that such signaling may be used for a video format. In that case, the signaling can be performed by, for example, defining AttributeSelectionBox('atsl') having a field similar to that of ItemProperty('atsl'), and storing AttributeSelectionBox('atsl') into a metadata track or the like.

<System Configuration>

The system configuration of a data generation device and a data reproduction device to which the present technology is applied will be explained with reference to FIGS. 40 and 41.

Figure 40:
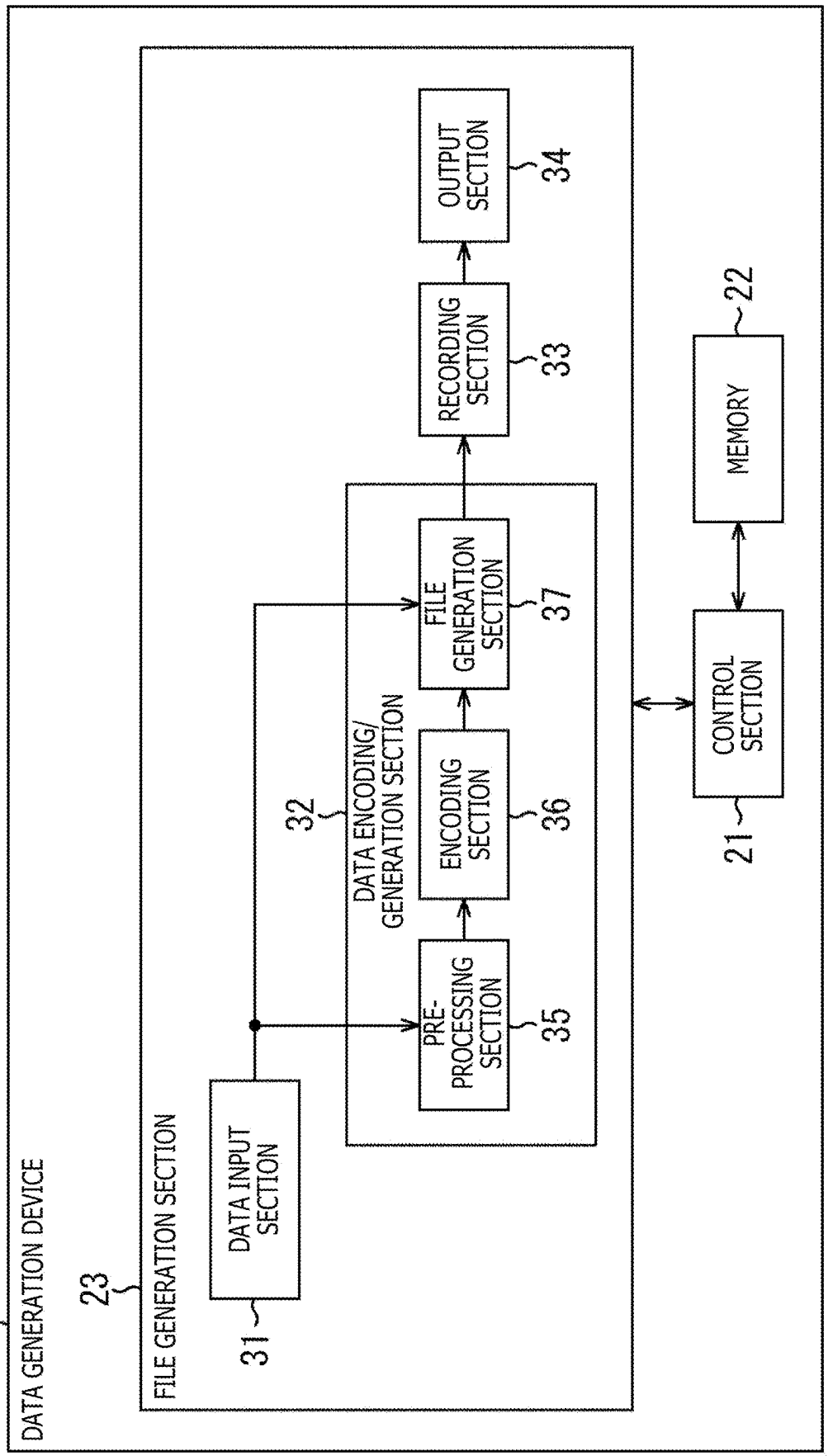
FIG. 40 is a block diagram depicting one example of a data generation device.

FIG. 40 is a block diagram depicting a configuration example of the data generation device.

As depicted in FIG. 40, the data Generation device 11 includes a control section 21, a memory 22, and a file generation section 23. For example, various kinds of data necessary for the control section 21 to control the file generation section 23 is stored in the memory 22. By referring to the data, the control section 21 controls generation of a file in the file generation section 23.

The file generation section 23 includes a data input section 31, a data encoding/generation section 32, a recording section 33, and an output section 34. For example, data inputted to the data input section 31 is supplied to the data encoding/generation section 32. Then, a file generated by the data encoding/generation section 32 is outputted from the output section 34 via the recording section 33, and is recorded into a recording medium, for example.

The data encoding/generation section 32 includes a pre-processing section 35, an encoding section 36, and a file generation section 37.

The pre-processing section 35 executes a process of generating a geometry image, a texture image, various kinds of metadata, etc., from a point cloud inputted from the data input section 31.

The encoding section 36 executes a process of encoding the point cloud by using V-PCC or G-PCC.

The file generation section 37 executes a process of storing the metadata generated by the pre-processing section 35 together with V-PCC still image data or G-PCC still image data into a file having a file structure using the ISOBMFF technology, and generating the file.

FIG. 41 is a block diagram depicting a configuration example of the data reproduction device.

The data reproduction device 12 includes a control section 41, a memory 42, and a reproduction processing section 43, as depicted in FIG. 41. For example, various kinds of data necessary for the control section 41 to control the reproduction processing section 43 is stored in the memory 42. By referring to the data, the control section 41 controls reproduction of a point cloud in the reproduction processing section 43.

The reproduction processing section 43 includes an acquisition section 51, a display control section 52, a data analysis/decoding section 53, and the display section 54. For example, a file that is acquired by the acquisition section 51 and that is read from, for example, a recording medium or the like is supplied to the data analysis/decoding section 53. Then, a display screen that is generated by the data analysis/decoding section 53 under display control of the display control section 52 is displayed on the display section 54.

The data analysis/decoding section 53 includes a file analysis section 55, a decoding section 56, and a display information generation section 57, and executes the reproduction process which has been explained with reference to FIGS. 8 and 9 mentioned above.

The file analysis section 55 extracts V-PCC still image data or G-PCC still image data from a file having a file structure using the ISOBMFF technology, and executes a process of analyzing metadata.

In addition, the decoding section 56 executes a process of decoding V-PCC still image data or G-PCC still image data by V-PCC or G-PCC according to the metadata acquired by the file analysis section 55.

In addition, the display information generation section 57 generates a display screen by constructing a point cloud and rendering the point cloud.

<File Generation Process>

Figure 42:
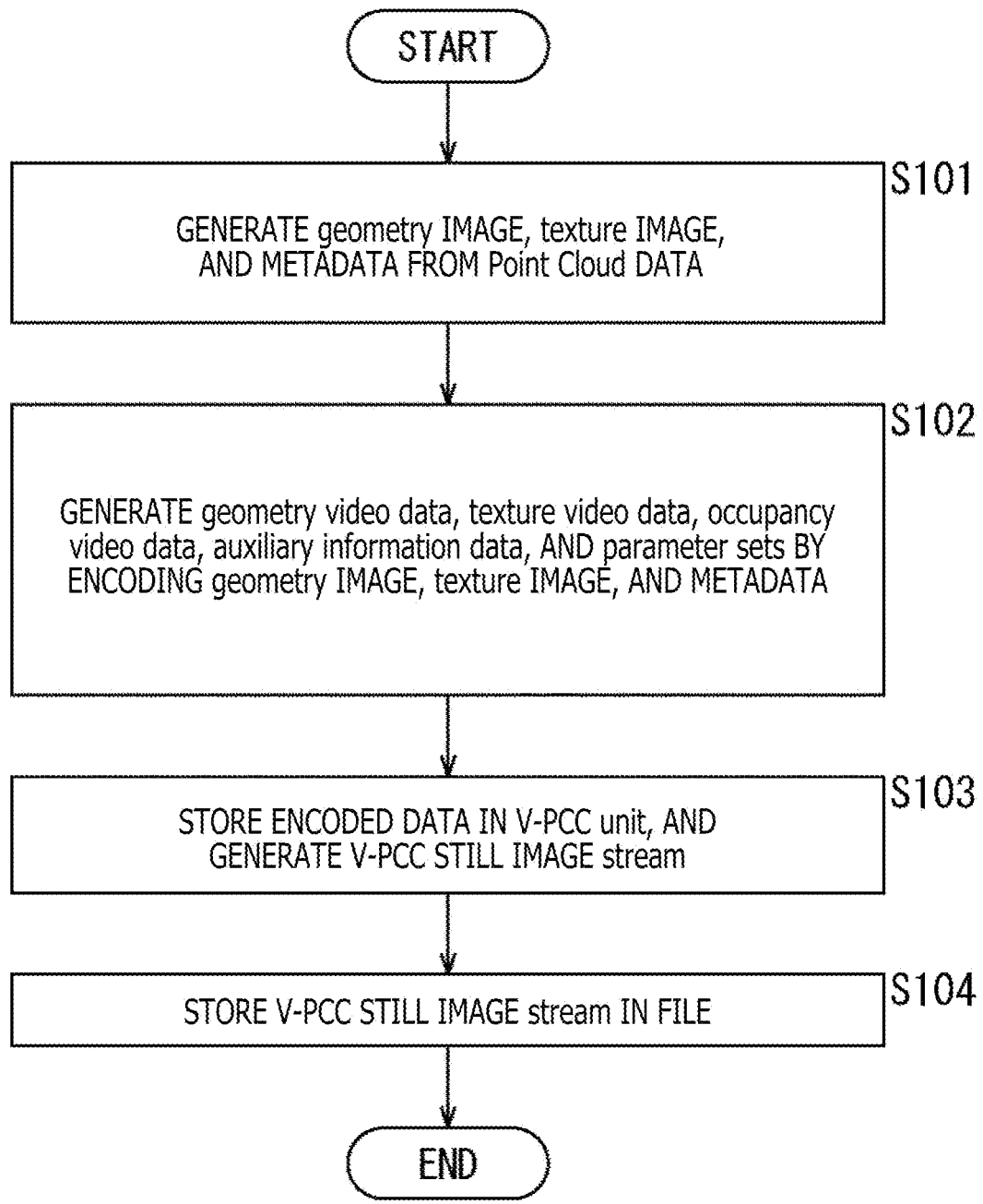
FIG. 42 is a flowchart for explaining a file generation process of generating a file in which a V-PCC still image stream is stored.

FIG. 42 is a flowchart for explaining a file generation process in which the data encoding/generation section 32 of the data generation device 11 generates a file in which a V-PCC still image stream is stored.

In step S101, the pre-processing section 35 generates a geometry image, a texture image, and metadata from point cloud data, and supplies the geometry image, the texture image, and the metadata to the encoding section 36.

In step S102, the encoding section 36 encodes the geometry image, the texture image, and the metadata supplied from the pre-processing section 35 in step S101. As a result, the encoding section 36 generates geometry video data, texture video data, occupancy video data, auxiliary information data, and parameter sets, and supplies the generated data and parameter sets to the file generation section 37.

In step S103, the file generation section 37 generates a V-PCC still image stream by storing the various kinds of data encoded by the encoding section 36 in step S102 into a V-PCC unit.

In step S104, the file generation section 37 stores the V-PCC still image stream generated in step S104 into a file having a file structure including the metadata and using the ISOBMFF technology, and supplies the file to the recording section 33. Thereafter, the process is ended.

Figure 43:
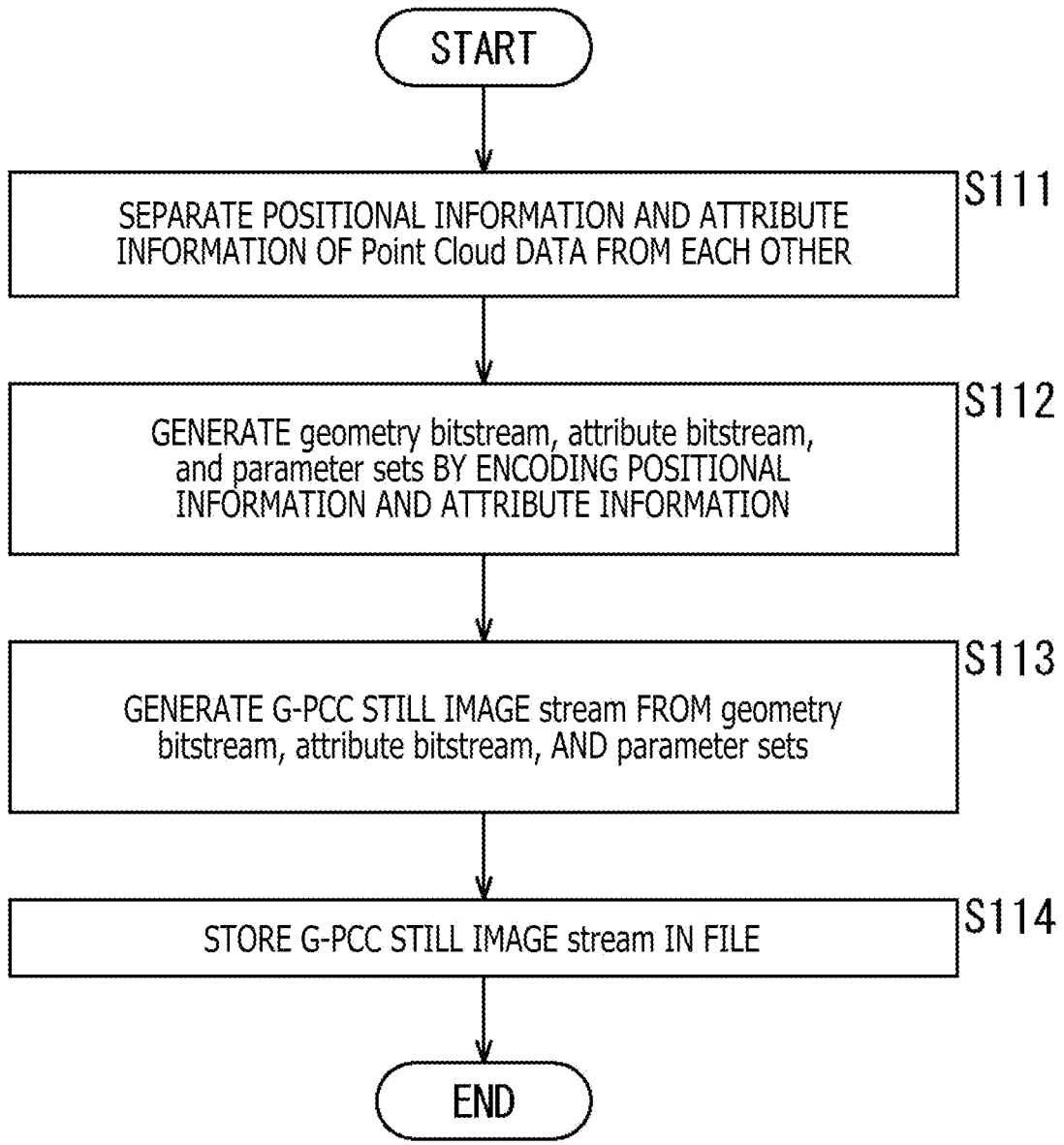
FIG. 43 is a flowchart for explaining a file generation process of generating a file in which a G-PCC still image stream is stored.

FIG. 43 is a flowchart for explaining a file generation process in which the data encoding/generation section 32 of the data generation device 11 generates a file in which a G-PCC still image stream is stored.

In step S111, the pre-processing section 35 separates positional information and attribute information in point cloud data, and supplies the positional information and the attribute information to the encoding section 36.

In step S112, the encoding section 36 separately encodes the positional information and the attribute information supplied from the pre-processing section 35 in step S111. As a result, the encoding section 36 generates a geometry bitstream, an attribute bitstream, and parameter sets, and supplies the bitstreams and the parameter sets to the file generation section 37.

In step S113, the file generation section 37 generates a G-PCC still image stream from the geometry bitstream, the attribute bitstream, and the parameter sets supplied from the encoding section 36 in step S112.

In step S114, the file generation section 37 stores the G-PCC still image stream generated in step S113 into a file having a file structure including the metadata and using the ISOBMFF technology, and supplies the file to the recording section 33. Thereafter, the process is ended.

As explained so far, according to the present technology, V-PCC still image data or G-PCC still image data having no time information can be stored in a file having a file structure using the ISOBMFF technology.

For example, in a case where a V-PCC still image stream is stored as 1 item, a client can easily determine the feasibility of reproduction without decoding Video data units.

In addition, in a case where a V-PCC still image stream is stored as multi items, the abovementioned first to third schemes enable the following points. That is, by the first scheme, a reproduction start point is clearly specified, so that the client is allowed to easily make access to items constituting V-PCC. Moreover, by the second scheme, decoded data and metadata for reconstructing a point cloud are associated with each other, so that a point cloud can be reconstructed even from V-PCC still image data including a plurality of attributes, for example. Further, by the third scheme, Geometry data, Occupancy data, and Attribute data, which are stored as Image Items, are prohibited from being reproduced singly.

Further, in V-PCC or G-PCC, access to a geometory, an attribute, and data (metadata (Auxiliary information, occupancy in V-PCC only)) can be made to allow the client to easily execute a selection and reproduction process of attribute information. Accordingly, in a use case where attribute information such as a color or a reflectance is unnecessary but only three-dimensional information regarding a point cloud is used, client processes can be facilitated. In a case where a plurality of kinds of attribute information such as a color and a reflectance is provided, client processes in a use case where only a color attribute is used together with a geometry for preview, for example, can also be facilitated. In addition, from among combinations of kinds of attribute information to be used for reproduction, a content owner can designate reproduction using a particular combination only.

<Configuration Example of Computer>

Next, a series of the abovementioned processes (information processing method) can be executed by hardware, or can be executed by software. In a case where the series of the processes is executed by software, a program forming the software is installed into a general-purpose computer or the like.

Figure 44:
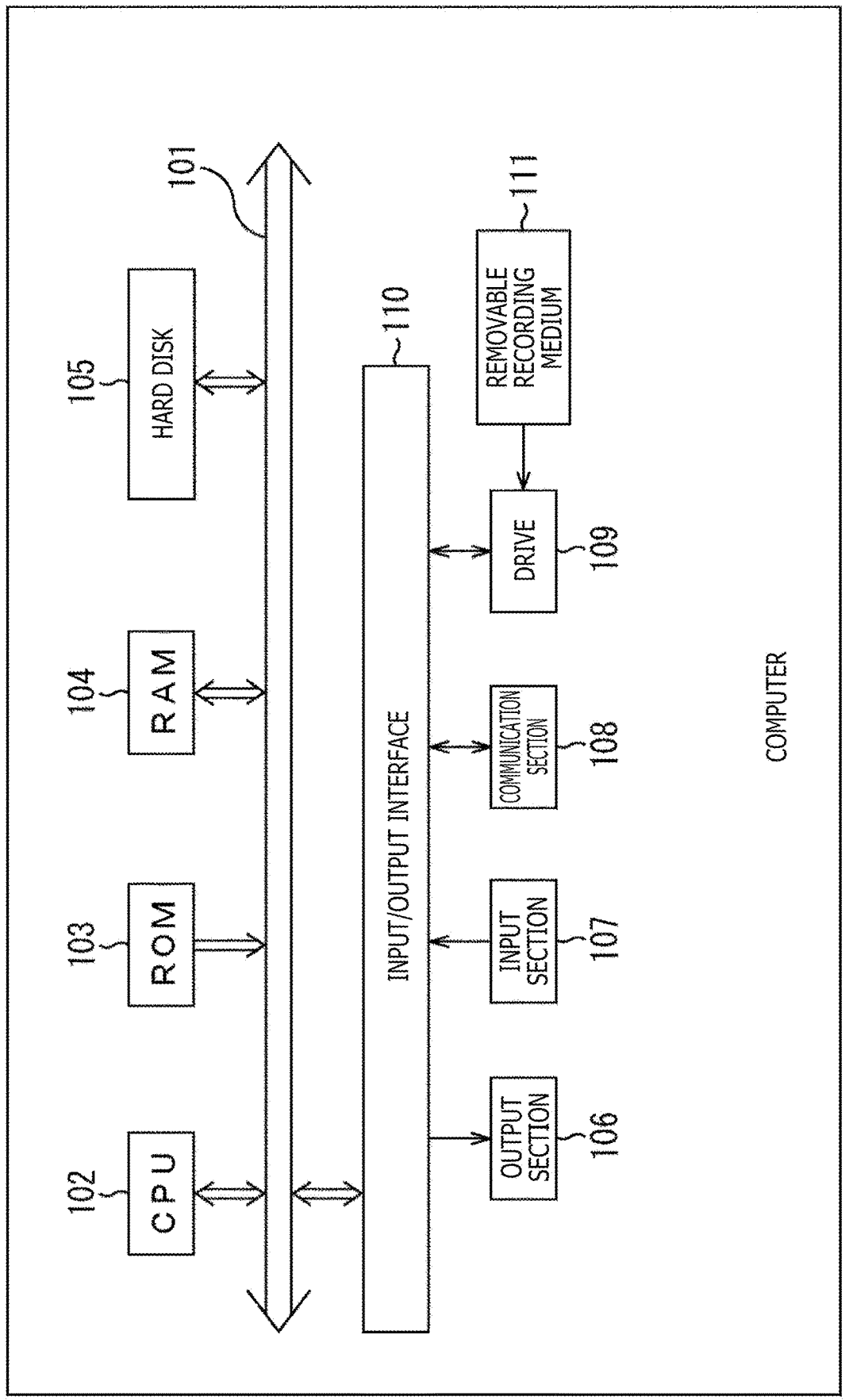
FIG. 44 is a block diagram depicting a configuration example of one embodiment of a computer to which the present technology is applied.

FIG. 44 is a block diagram depicting a configuration example of one embodiment of a computer into which a program for executing the series of the abovementioned processes is installed.

The program can be previously recorded in a hard disk 105 or a ROM 103 serving as a recording medium included in the computer.

Alternatively, the program can be stored (recorded) in a removable recording medium 111 that is driven by a drive 109. The removable recording medium 111 can be provided in the form of what is generally called packaged software. Here, examples of the removable recording medium 111 include a flexible disc, a CD-ROM (Compact Disc Read Only Memory), an MO (Magneto Optical) disc, a DVD (Digital Versatile Disc), a magnetic disc, and a semiconductor memory.

It is to be noted that the program can be installed into the computer via the abovementioned removable recording medium 111, or can be downloaded into the computer over a communication network or a broadcasting network, and be installed into the hard disk 105 incorporated in the computer. Specifically, for example, the program can be wirelessly transferred to the computer from a download site via an artificial satellite for digital satellite broadcasting, or can be transferred by wire via a network such as a LAN (Local Area Network) or the internet.

A CPU (Central Processing Unit) 102 is incorporated in the computer. An input/output interface 110 is connected to the CPU 102 via a bus 101.

When receiving a command via the input/output interface 110 as a result of a user's operation on an input section 107, for example, the CPU 102 executes the program stored in the ROM (Read Only Memory) 103 according to the command. Alternatively, the CPU 102 loads the program stored in the hard disk 105 into a RAM (Random Access Memory) 104, and then, executes the program.

As a result, the CPU 102 executes the processes following the above flowcharts, or processes which are implemented by the configuration in the above block diagrams. Then, for example, the CPU 102 outputs the process result from an output section 106, if needed, via the input/output interface 110, for example, or transmits, from a communication section 108, the process result, for example, so as to be recorded in the hard disk 105.

It is to be noted that the input section 107 includes a keyboard, a mouse, a microphone, or the like. The output section 106 includes an LCD (Liquid Crystal Display), a loudspeaker, or the like.

Here, the processes which are executed herein by the computer according to the program are not necessarily required to be executed in time series according to the order depicted in the flowcharts. That is, the processes which are executed by the computer according to the program include processes that are executed in parallel or executed independently (e.g., parallel processes, or processes by objects).

In addition, the program may be processed by one computer (processor), or may be distributedly processed by a plurality of computers. Further, the program may be executed after being transferred co a remote computer.

Further, the term "system" in the present description means a set of multiple constituent components (devices, modules (components), etc.). Whether or not all the constituent components are included in the same casing does not matter. Therefore, a set of multiple devices that are housed in different casings and are connected over a network is a system, and further, a single device having multiple module housed in a single casing is also a system.

In addition, for example, the configuration having been explained as one device (or processing section) may be divided into multiple devices (or processing sections). In contrast, a configuration explained as a set of multiple devices (or processing sections) may be integrated into one device (or processing section). Further, a configuration other than the abovementioned configurations may be added to the configuration of each device (or each processing section). Further, as long as the configuration or operation of an entire system is substantially not changed, a partial configuration of a certain device (or processing section) may be included into the configuration of another device (or another processing section).

Moreover, for example, the present technology can be configured by cloud computing in which one function is shared and cooperatively processed by multiple devices over a network.

In addition, the abovementioned program can be executed in any device, for example. In that case, it is sufficient if the device has a necessary function (functional block, etc.) to be able to obtain necessary information.

In addition, for example, the steps having been explained in the above flowcharts may be executed by one device, or may be cooperatively executed by a plurality of devices. Moreover, in a case where a plurality of processes is included in one step, the plurality of processes included in the one step may be executed by one device, or may be cooperatively executed by a plurality of devices. In other words, a plurality of processes included in one step can be executed as processes in a plurality of steps. Alternatively, a plurality of steps in the above explanation may be executed together as one step.

It is to be noted that the program which is executed by the computer may be set to execute processes in steps describing the program in the time-series order explained herein, or may be set to execute the processes in steps independently at necessary timings including a timing when a call is made. That is, the steps may be executed in an order different from that described above, as long as there is no inconsistency. Moreover, the processes in steps describing the program may be executed in parallel with processes of another program, or may be executed in combination with processes of another program.

Multiple aspect of the present technology explained herein can be implemented independently and singly as long as there is no inconsistency. It goes without saying that any multiple aspects of the present technology can be implemented in combination. For example, a part or the entirety of the present technology explained in any one of the embodiments can be implemented in combination with a part or the entirety of the present technology explained in another one of the embodiments. In addition, any part or the entirety of the abovementioned present technology can be implemented in combination with another technology which has not been explained above.

<Configuration Combining Examples>

It is to be noted that the present technology may also have the following configurations.

(1)

An information processing device including:

a metadata generation section that generates metadata that includes reproduction information necessary to reproduce a bitstream generated from 3D data having no time information and that includes reproduction feasibility information to be used to determine feasibility of reproducing the bitstream; and a file generation section that generates a file in which the bitstream and the metadata are stored.

(2)

The information processing device according to (1), in which the reproduction information includes combination information that indicates a combination of Video data units to be used in reproduction, among the Video data units constituting the bitstream.

(3)

The information processing device according to (2), in which the reproduction feasibility information includes a parameter set for the bitstream.

(4)

The information processing device according to (3), in which the reproduction feasibility information further includes Sub-Sample parameter sets corresponding to the respective Video data units.

(5)

The information processing device according to (3), in which the file generation section stores the reproduction feasibility information into Item Property.

(6)

The information processing device according to (4), in which the file generation section stores, into Item Property, Profile information for each of the Video data units, of the parameter set included in the reproduction feasibility information.

(7)

The information processing device according to any one of (1) to (6), in which the metadata generation section generates the metadata for performing reproduction by selecting Attribute data.

(8)

The information processing device according to (7), in which the metadata is SubSampleItemProperty in a case of 1 item, and selective reproduction is permitted in a case of multi items.

(9)

The information processing device according to (7), in which the metadata generation section generates the metadata that indicates a reproduction combination.

(10)

An information processing method executed by an information processing device, the method including:

generating metadata that includes reproduction information necessary to reproduce a bitstream generated from 3D data having no time information and that includes reproduction feasibility information to be used to determine feasibility of reproducing the bitstream; and generating a file in which the bitstream and the metadata are stored.

(11) An information processing device including:
a metadata generation section that generates metadata that includes reproduction information necessary to reproduce a plurality of bitstreams generated from 3D data having no time information and that includes reproduction feasibility information to be used to determine feasibility of reproducing the bitstreams; and
a file generation section that generates a file in which the bitstreams and the metadata are stored.

(12) The information processing device according to (11), in which
the reproduction information includes bitstream combination information that indicates a combination of the bitstreams to be used for reproduction, and reproduction start point information that indicates a reproduction start point.

(13) The information processing device according to (12), in which
the reproduction start point information is item_id that indicates a bitstream to be reproduced first.

(14) The information processing device according to (12), in which
the reproduction information further includes a V-PCC Unit Header as information for reconstructing the 3D data from the bitstreams, the V-PCC Unit Header being information for identifying Type of each of the bitstreams.

(15) The information processing device according to (14), in which
the reproduction feasibility information includes information that indicates that each of the bitstreams is a part of data forming the 3D data, and
the file generation section stores the reproduction feasibility information into Item Property.

(16) The information processing device according to (15), is which
the reproduction feasibility information further includes process determination information that indicates whether or not each of the bitstreams is able to be considered to form 3D data and be processed.

(17) The information processing device according to (15), in which
the reproduction feasibility information further includes, as determination information for allowing a determination that an item is not able to be singly displayed, information that indicates a hidden image, and
the file generation section stores the information that indicates the hidden image into ItemInfoEntry.

(18) An information processing method executed by an information processing device, the method including:
generating metadata that includes reproduction information necessary to reproduce a plurality of bitstreams generated from 3D data having no time information and that includes reproduction feasibility information to be used to determine feasibility of reproducing the bitstreams; and
generating a file in which the bitstreams and the metadata are stored.

It is to be noted that the present embodiment is not limited to those previously explained, and various modifications can be made within the scope of the gist of the present disclosure. In addition, the effects described herein are just examples, and are not limited effects. Any other effect may be provided.

REFERENCE SIGNS LIST

11: Data generation device
12: Data reproduction device
21: Control section
22: Memory
23: File generation section
31: Data input section
32: Data encoding/generation section
33: Recording section
34: Output section
35: Pre-processing section
36: Encoding section
37: File generation section
41: Control section
42: Memory
43: Reproduction processing section
51: Acquisition section
52: Display control section
53: Data analysis/decoding section
54: Display section
55: File analysis section
56: Decoding section
57: Display information generation section

The invention claimed is:
1. An information processing device comprising:
a metadata generation section configured to generate metadata that includes
reproduction information necessary to reproduce a bitstream from among a plurality of bitstreams generated from 3D data having no time information, and
reproduction feasibility information to be used to determine feasibility of reproducing the bitstream generated from the 3D data; and
a file generation section configured to generate a file in which the bitstream generated from the 3D data and the metadata are stored,
wherein the reproduction information includes
bitstream combination information that indicates a combination of bitstreams among the plurality of bitstreams to be used for reproduction, and
reproduction start point information that indicates a reproduction start point,
wherein the reproduction start point information indicates a bitstream among the plurality of bitstreams to be reproduced first,
wherein the reproduction information further includes a V-PCC Unit Header as information for reconstructing the 3D data from the plurality of bitstreams,
wherein the V-PCC Unit Header is signaled using a V-PCC still image format,
wherein the reproduction feasibility information is indicated using a structure of a file configuration of an ItemProperty within the generated file,
wherein the reproduction feasibility information includes information that indicates that each bitstream of the plurality of bitstreams is a part of data forming the 3D data,
wherein the reproduction feasibility information further includes, as determination information for allowing a determination that an item is not able to be singly displayed, information that indicates a hidden image, and wherein the metadata generation section and the file generation section are each implemented via at least one processor.

2. The information processing device according to claim 1, wherein
the reproduction feasibility information includes a parameter set for the bitstream.

3. The information processing device according to claim 2, wherein
the file generation section stores the reproduction feasibility information into Item Property.

4. An information processing method executed by an information processing device, the method comprising:
generating metadata that includes
reproduction information necessary to reproduce a bitstream from among a plurality of bitstreams generated from 3D data having no time information, and
reproduction feasibility information to be used to determine feasibility of reproducing the bitstream generated from the 3D data; and
generating a file in which the bitstream generated from the 3D data and the metadata are stored,
wherein the reproduction information includes
bitstream combination information that indicates a combination of bitstreams among the plurality of bitstreams to be used for reproduction, and
reproduction start point information that indicates a reproduction start point,
wherein the reproduction start point information indicates a bitstream among the plurality of bitstreams to be reproduced first,
wherein the reproduction information further includes a V-PCC Unit Header as information for reconstructing the 3D data from the plurality of bitstreams,
wherein the V-PCC Unit Header is signaled using a V-PCC still image format,
wherein the reproduction feasibility information is indicated using a structure of a file configuration of an ItemProperty within the generated file,
wherein the reproduction feasibility information includes information that indicates that each bitstream of the plurality of bitstreams is a part of data forming the 3D data, and
wherein the reproduction feasibility information further includes, as determination information for allowing a determination that an item is not able to be singly displayed, information that indicates a hidden image.

5. An information processing device comprising:
a metadata generation section configured to generate metadata that includes
reproduction information necessary to reproduce a plurality of bitstreams generated from 3D data having no time information, and
reproduction feasibility information to be used to determine feasibility of reproducing the plurality of bitstreams generated from the 3D data; and
a file generation section configured to generate a file in which the plurality of bitstreams generated from the 3D data and the metadata are stored,
wherein the reproduction information includes
bitstream combination information that indicates a combination of bitstreams among the plurality of bitstreams to be used for reproduction, and
reproduction start point information that indicates a reproduction start point,
wherein the reproduction start point information indicates a bitstream among the plurality of bitstreams to be reproduced first,
wherein the reproduction information further includes a V-PCC Unit Header as information for reconstructing the 3D data from the plurality of bitstreams,
wherein the V-PCC Unit Header is signaled using a V-PCC still image format,
wherein the reproduction feasibility information is indicated using a structure of a file configuration of an ItemProperty within the generated file,
wherein the reproduction feasibility information includes information that indicates that each bitstream of the plurality of bitstreams is a part of data forming the 3D data,
wherein the reproduction feasibility information further includes, as determination information for allowing a determination that an item is not able to be singly displayed, information that indicates a hidden image, and
wherein the metadata generation section and the file generation section are each implemented via at least one processor.

6. The information processing device according to claim 5, wherein
the reproduction start point information is item_id that indicates the bitstream among the plurality of bitstreams to be reproduced first.

7. The information processing device according to claim 5, wherein
the V-PCC Unit Header is information for identifying a Type of each bitstream of the plurality of bitstreams.

8. The information processing device according to claim 7, wherein
the file generation section stores the reproduction feasibility information into the ItemProperty within the generated file.

9. The information processing device according to claim 8, wherein
the file generation section stores the information that indicates the hidden image into Item InfoEntry.

10. An information processing method executed by an information processing device, the method comprising:
generating metadata that includes
reproduction information necessary to reproduce a plurality of bitstreams generated from 3D data having no time information, and
reproduction feasibility information to be used to determine feasibility of reproducing the plurality of bitstreams generated from the 3D data; and
generating a file in which the plurality of bitstreams generated from the 3D data and the metadata are stored,
wherein the reproduction information includes
bitstream combination information that indicates a combination of bitstreams among the plurality of bitstreams to be used for reproduction, and
reproduction start point information that indicates a reproduction start point,
wherein the reproduction start point information indicates a bitstream among the plurality of bitstreams to be reproduced first,
wherein the reproduction information further includes a V-PCC Unit Header as information for reconstructing the 3D data from the plurality of bitstreams, wherein the V-PCC Unit Header is signaled using a V-PCC still image format, wherein the reproduction feasibility information is indicated using a structure of a file configuration of an ItemProperty within the generated file, wherein the reproduction feasibility information includes information that indicates that each bitstream of the plurality of bitstreams is a part of data forming the 3D data, and wherein the reproduction feasibility information further includes, as determination information for allowing a determination that an item is not able to be singly displayed, information that indicates a hidden image.

11. The information processing device according to claim 1, wherein the Item Property is signaled using an Item PropertyContainerBox.

* * * * *